US012236315B2

(12) United States Patent
Watanabe et al.

(10) Patent No.: US 12,236,315 B2
(45) Date of Patent: Feb. 25, 2025

(54) LASER PROCESSING SYSTEM AND LIGHT IRRADIATOR

(71) Applicants: Kazunori Watanabe, Tokyo (JP); Yoshinori Hayashi, Kanagawa (JP)

(72) Inventors: Kazunori Watanabe, Tokyo (JP); Yoshinori Hayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 39 days.

(21) Appl. No.: 18/097,510

(22) Filed: Jan. 17, 2023

(65) Prior Publication Data

US 2023/0237292 A1 Jul. 27, 2023

(30) Foreign Application Priority Data

Jan. 25, 2022 (JP) .................. 2022-009622

(51) Int. Cl.
*G06K 7/10* (2006.01)
*G06K 7/016* (2006.01)
*G06K 7/14* (2006.01)

(52) U.S. Cl.
CPC ........... *G06K 7/1434* (2013.01); *G06K 7/016* (2013.01); *G06K 7/10574* (2013.01)

(58) Field of Classification Search
CPC .......... G06K 7/10722; G06K 7/10584; G06K 7/10564; G06K 7/10623; G06K 7/10554; G06K 7/1417; G06K 7/015; G06K 7/1465; G06K 7/1404; G06K 7/1434; G06K 7/016; G06K 7/1054; G06K 7/1443

(Continued)

(56) References Cited

U.S. PATENT DOCUMENTS 6,554,189 B1 * 4/2003 Good .................. G06K 7/109
235/462.31
6,758,402 B1 * 7/2004 Check .................. G06K 7/14
235/462.34

(Continued)

FOREIGN PATENT DOCUMENTS

JP 2009-183960 8/2009
JP 2021-020242 2/2021

(Continued)

OTHER PUBLICATIONS

Extended European Search Report issued Jul. 10, 2023 in European Patent Application No. 23151700.4, 7 pages.

*Primary Examiner* — Daniel St Cyr
(74) *Attorney, Agent, or Firm* — XSENSUS LLP

(57) ABSTRACT

A laser processing system includes: a first light irradiator including: a first light emitter to emit first laser light; and a first light scanner to scan a first region of a workpiece with the first laser light emitted from the first light emitter; a second light irradiator including: a second light emitter to emit second laser light; and a second light scanner to scan a second region different from the first region of the workpiece with the second laser light emitted from the second light emitter. The first light irradiator emits the first laser light to the first region of the workpiece in a first irradiation direction, the second light irradiator emits the second laser light to the second region of the workpiece in a second irradiation direction opposite to the first irradiation direction.

14 Claims, 27 Drawing Sheets

(58) Field of Classification Search
USPC .................... 235/462.01, 462.06, 462.14
See application file for complete search history.

(56) References Cited

U.S. PATENT DOCUMENTS

| | | | |
|---|---|---|---|
| 2002/0056891 A1 | 5/2002 | Wu | |
| 2006/0038009 A1* | 2/2006 | Russell | G07G 1/0045 235/462.14 |
| 2009/0095047 A1* | 4/2009 | Patel | G06K 7/015 73/1.01 |
| 2013/0068840 A1* | 3/2013 | Kearney | G06K 7/10613 235/462.14 |
| 2013/0206840 A1* | 8/2013 | Furlong | G06K 7/1095 235/470 |
| 2019/0151996 A1 | 5/2019 | Robinson et al. | |
| 2021/0402805 A1 | 12/2021 | Tamura et al. | |
| 2022/0097414 A1 | 3/2022 | Hirayama et al. | |
| 2022/0118553 A1 | 4/2022 | Miyanishi et al. | |
| 2022/0266392 A1 | 8/2022 | Hirayama et al. | |
| 2022/0276042 A1 | 9/2022 | Fujita et al. | |
| 2022/0305812 A1 | 9/2022 | Funahashi et al. | |
| 2022/0388744 A1 | 12/2022 | Funahashi | |
| 2022/0410608 A1 | 12/2022 | Hirayama et al. | |

FOREIGN PATENT DOCUMENTS

| | | |
|---|---|---|
| JP | 2021-176648 | 11/2021 |
| JP | 2022-015739 | 1/2022 |
| JP | 2022-035975 | 3/2022 |
| JP | 2022-035976 | 3/2022 |
| JP | 2022-056333 | 4/2022 |
| JP | 2022-057612 | 4/2022 |
| JP | 2022-058127 | 4/2022 |
| JP | 2022-086838 | 6/2022 |
| JP | 2022-187536 | 12/2022 |

* cited by examiner

ABLATION

MELTING

CRYSTALLIZATION

FOAMING

▨ : INPUT IMAGE PRINTING REGION
☐ : INPUT IMAGE NON-PRINTING REGION
⌐ ¬ : FINE STRUCTURE
⌊ ⌋

▨ : INPUT IMAGE PRINTING REGION
☐ : INPUT IMAGE NON-PRINTING REGION
◌ : FINE STRUCTURE

A-1

A-2

B-1

B-2

C-1

C-2

LASER PROCESSING SYSTEM AND LIGHT IRRADIATOR

CROSS-REFERENCE TO RELATED APPLICATIONS

This patent application is based on and claims priority pursuant to 35 U.S.C. § 119(a) to Japanese Patent Application No. 2022-009622, filed on Jan. 25, 2022, in the Japan Patent Office, the entire disclosure of which is incorporated by reference herein.

BACKGROUND

Technical Field

Embodiments of this disclosure relate to a laser processing system and a light irradiator.

Related Art

Recently, plastic wastes have caused ocean plastic pollution. Activities to reduce or eliminate plastic wastes are intensified worldwide. A plastic bottle such as a polyethylene terephthalate (PET) bottle is a cause of the plastic wastes. However, a large amount of the plastic bottles for beverage is produced, sold, and used because the plastic bottle has advantages in distribution, sale, and storage.

Most PET bottles for beverage have a label attached on the PET bottles for the purpose of product management and sales promotion. Many pieces of information indispensable for consumers, for example, a product name, ingredients, an expiration date, a barcode, a QR code (registered trademark), a recycle symbol, and a logo, are printed on the label. In addition, pictures or illustrations designed by beverage manufacturers to attract consumer's attention are printed on the label. Such pictures or illustrations differentiate one product form other products or increase in competitiveness. As described above, a label on which many pieces of information are printed is usually attached to the plastic bottle such as a PET bottle for beverage.

SUMMARY

A laser processing system includes: a first light irradiator including: a first light emitter to emit first laser light; and a first light scanner to scan a first region of a workpiece with the first laser light emitted from the first light emitter; a second light irradiator including: a second light emitter to emit second laser light; and a second light scanner to scan a second region different from the first region of the workpiece with the second laser light emitted from the second light emitter. The first light irradiator emits the first laser light to the first region of the workpiece in a first irradiation direction, the second light irradiator emits the second laser light to the second region of the workpiece in a second irradiation direction opposite to the first irradiation direction.

Further, an embodiment of the present disclosure provides a light irradiator includes: a light emitter to emit laser light; a light scanner to scan a workpiece with the laser light emitted from the light emitter; a first emitting port from which the laser light is emitted; and a second emitting port from which the laser light is emitted, the second emitting port being different from the first emitting port. The laser light emitted from the first emitting port is emitted to a first processing surface of a first region of the workpiece, the laser light emitted from the second emitting port is emitted to a second processing surface of a second region different form the first region of the workpiece, and a normal direction of the first processing surface and a normal direction of the second processing surface have an angle difference.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1A:
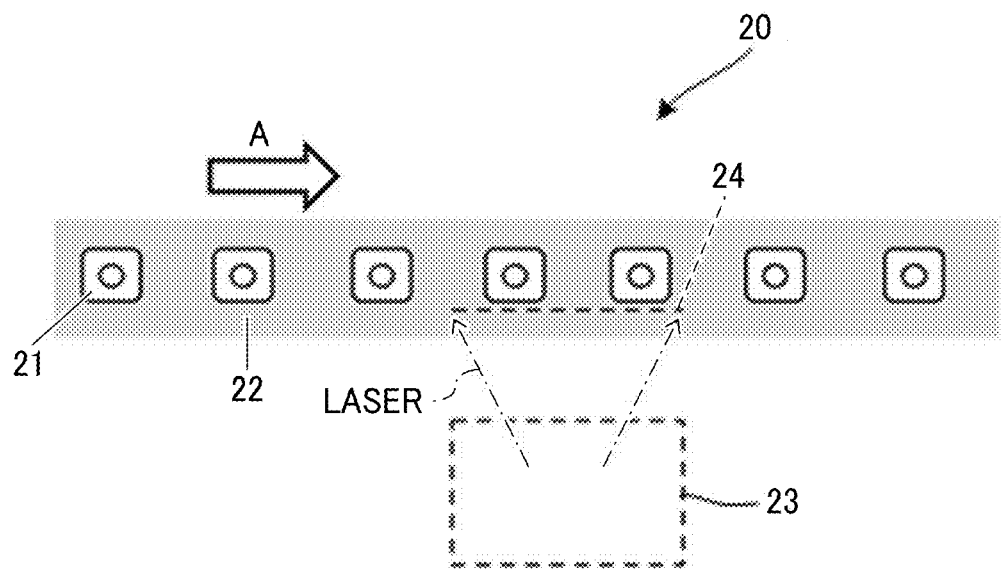
FIG. 1A is a plane view of a laser processing system to from a predetermined processing shape on the surface of the PET bottle as a workpiece according to the first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

According to the embodiments of the present invention, a laser processing system to increase the relative positional accuracy at multiple positions on a workpiece and to add information on the workpiece at higher speed with a simpler device configuration is provided.

A PET bottle for beverage having the label is collected for the purpose of recycling to reduce the environmental load, after consumers consume the content of the PET bottle. Recycling the PET bottle for beverage is referred to as "bottle to bottle" which promotes circular recycling. In the circular recycling of the PET bottle for beverage, a used PET bottle is separated and collected, converted into flakes as a raw material of the PET bottle for beverage by a recycler, and reproduced as the PET bottle. In particular, proper separation and collection of the used PET bottle facilitates the circular recycling.

The PET bottle for beverage includes the label and the cap made of different materials. Thus, the PET bottle, the label, and the cap are properly separated from each other in the recycling. Although the consumer separates the cap and label from each PET bottle, it is inconvenient for the consumer. The cap is inevitably removed from the PET bottle because the consumer removes the cap before drinking. However, the label is manually peeled off and separated by the consumer (i.e., manual process). The manual process in recycling may be inconvenience for the consumer. In other words, the manual process causes difficulties in recycling the PET bottle for beverage in mass consumption.

In the present disclosure, for example, at least two light emitting devices are used to process the front surface (front processing region) and back surface (back processing region) of a PET bottle as a workpiece. For example, one light emitting device emits first laser light to the front processing region of the PET bottle region to process, and the other light emitting devices emits second laser light to the back processing region of the PET bottle to process. The first laser light and the second laser light hit the processing regions of the PET bottle from the opposite directions. The two light emitting devices are arranged adjacent to each other along the conveying direction of the PET bottle. Herein, the second light emitting device is disposed on the downstream of the first light emitting device along the production line of the PET bottle. For example, immediately after the first light emitting devices processed the front processing region of the PET bottle (first processing), and the second light emitting devices processes the back processing region of the PET bottle (second processing). Since the time lag between the first processing and the second processing is shorter, the orientation of the PET bottle is hard to change, and the back processing region is processed with holding substantially the same orientation with the front processing region. As a result, the relative positional accuracy between the front and back processing regions of the PET bottle is increased with a simpler configuration.

In the laser processing system according to the first embodiment, multiple light emitting devices are provided, and a first light emitting device emits laser light to a first region of the workpiece to process, and a second light emitting device emits laser light to a second region of the workpiece to process. The first region and the second region are different region on the workpiece. The normal line of the first region and the normal line of the second region has an angle difference. In other words, the laser processing system processes multiple different regions of the workpiece by using multiple light emitting devices. Thus, the conveyor does not have a complicated mechanism and the cost of the conveyor can be reduced. In addition, a relative positional accuracy in multiple positions on the workpiece is increased.

In an aspect of the first embodiment, the angle difference is preferably 90° or more and 270° or less. According to the present aspect, the angle difference between the normal direction of the processing surface of the first region and the normal direction of the processing surface of the second region is 90° or more and 270° or less in multiple regions on the workpiece, and the processing regions having an angle difference in the normal direction of the processing surface are processed by using another light emitting device. As a result, the conveyor is less likely to be complicated, the cost of the conveyor is reduced, and a relative positional accuracy in multiple positions on the workpiece is increased.

In an aspect of the first embodiment, the workpiece is conveyed to a processing region of multiple light emitting devices by a conveyor, and the first light emitting device and the second light emitting device are arranged adjacently each other along a conveying direction. According to the present aspect, the multiple light emitting devices are arranged adjacently each other along the conveying direction of the workpiece. As a result, the time difference in processing start is reduced, the factor of the orientation variation of the workpiece other than the conveying direction is less likely to occur, and the relative positional accuracy at multiple positions on the workpiece is increased.

In an aspect of the first embodiment, the first light emitting device and the second light emitting device are made a pair, and the multiple pairs of light emitting devices are provided. According to the present aspect, the first light emitting device and the second light emitting device are made a pair, and multiple pairs of light emitting devices are provided, for example, by disposing the light emitting devices side by side to process the same workpiece. As a result, the relative positional accuracy at multiple positions on the workpiece is increased, and the higher productivity is achieved by multiply arranging the pair of light scanning devices arranged side by side.

In an aspect of the first embodiment, preferably, the orientation of the workpiece does not change in a direction other than the conveying direction in a conveying region from a processing start position of the first light emitting device to a processing end position of the second light emitting device. According to the present aspect, the orientation of the workpiece does not change in a direction other than the conveying direction in a conveying region from a processing start position of the first light emitting device to a processing end position of the second light emitting device. As a result, the relative positional accuracy at multiple positions on the workpiece is increased.

In an aspect of the first embodiment, preferably, the surfaces other than the setting surface of the workpiece does not contact the conveyor from a processing start position by the first light emitting device to a processing end position by the second light emitting device. According to the present aspect, the workpiece does not contact other members such as a guide in the conveying region from a processing start position by the first light emitting device to a processing end position by the second light emitting device, and the orientation of the workpiece does not change. As a result, the relative positional accuracy at multiple positions on the workpiece is increased.

In an aspect of the first embodiment, preferably, the first light emitting device has a first deflector and a first imaging optical element, the second light emitting device has a second deflector and a second imaging optical element, and the expression (1) below is satisfied.

$$L > (WD1+d/2) \times \tan(\theta 1/2) + CA1/2 + (WD2+d/2) \times \tan(\theta 2/2) + CA2/2 \quad (1)$$

In the expression (1), L is the length (mm) between the optical axis center of the first light emitting device and the optical axis center of the second light emitting device, the deflection angle $\theta 1$ (°) of the first deflector, the deflection angle $\theta 2$ (°) of the second deflector, the working distance WD1 (mm) of the first imaging optical element, the working distance WD2 (mm) of the second imaging optical element, the aperture size CA1 (mm) of the first imaging optical element, the aperture size CA2 (mm) of the second imaging optical device, and the maximum aperture size d (mm) of the workpiece. When the first light emitting device and the second light emitting device satisfy the expression (1) described above, the optical path of the adjacent first light emitting device is prevented from entering the second light emitting device, and the light emitting devices is hard to damage by the laser light emission.

In the laser processing system, the first light irradiator includes a first light scanner including: a first light deflector; and a first optical element attached to the first light deflector, the second light irradiator includes a second light scanner including: a second light deflector; and a second optical element attached to the second light deflector, and the laser processing system satisfy a following condition in which:

$$L > (WD1+d/2) \times \tan(\theta 1/2) + CA1/2 + (WD2+d/2) \times \tan(\theta 2/2) + CA2/2, \quad (1)$$

where L (mm) is a distance between a center of the optical axis of the first light irradiator and a center of the optical axis of the second light irradiator, $\theta 1$ (°) is a deflection angle of the first deflector, $\theta 2$ (°) is a deflection angle of the second deflector, WD1 (mm) is a working distance of the first imaging optical elemental element, WD2 (mm) is a working distance of the second imaging optical element, CA1 (mm) is a diameter of an aperture of the first imaging optical element, CA2 (mm) is a diameter of an aperture of the second imaging optical element, and d (mm) is a maximum diameter of the workpiece.

In an aspect of the first embodiment, preferably, a light shield is disposed between the first light emitting device and the second light emitting device. According to the present aspect, reflected laser light from the first light emitting device does not enter the second light emitting device. Thus, the first light emitting device is hard to damage by laser light emission from the second light emitting device. Herein, the first light emitting device and the second light emitting device are interchangeable. For example, the light shield includes a metal plate having a surface treatment or a resin plate having a light shielding functions, but is not limited thereto.

In an aspect of the first embodiment, preferably, the light emitting port in the light emitter of the first light emitting device and the emitting port in the light emitter of the second light emitting device are disposed on the same side with respect to the conveyor. According to the present aspect, the area of the light emitting device is reduced by arranging the multiple light emitting devices on one side of the conveyor.

In an aspect of the first embodiment, preferably, the emitting port in the light emitter of the first light emitting device and the emitting port in the light emitter of the second light emitting device are separately disposed on different sides with respect to the conveyor. According to the present aspect, depending on the specifications of the imaging optical element (e.g., an fθ lens) or other optical members as the light scanner, the area of the light emitting device becomes smaller by arranging the light emitting devices on both sides of the conveyor.

A laser processing system according to the second embodiment includes: multiple light emitting devices (e.g., first light emitting device and the second light emitting device) each including a light emitter to emit laser light; and a light scanner to scan a region of the workpiece with the laser light emitted from the light emitter. A first region on the workpiece is processed by the laser light (first laser light) emitted from the first light emitting device and a second region on the workpiece is processed by the laser light (second laser light) emitted from the second light emitting device are different regions on the workpiece. The first region is a projection on a conveying plane by the first laser light and the second region is a projection on the conveying plane by the second laser light. At least the first region or the second region crosses the conveyor. According to the second embodiment, the laser processing system includes: multiple light emitting devices (e.g., first light emitting device and the second light emitting device) each including a light emitter to emit laser light; and a light scanner to scan a region of the workpiece with the laser light emitted from the light emitter, and a first region on the workpiece is processed by the laser light (first laser light) emitted from the first light emitting device and a second region on the workpiece is processed by the laser light (second laser light) emitted from the second light emitting device are different regions on the workpiece, the first region is a projection on a conveying plane by the first laser light and the second region is a projection on the conveying plane by the second laser light, and either the first laser light or the second laser light crosses the conveyor. As a result, at least the first region or the second region crosses the conveyor in a configuration of the system, an area of the multiple light emitting devices is reduced. The conveying plane is a plane through which the bottom surface of the workpiece passes when the workpiece is conveyed on the conveying path in the processing area. When the workpiece is loaded and conveyed on the conveyor, the conveying plane is the contact (setting) surface of the workpiece on the conveyor.

In an aspect of the second embodiment, preferably, the laser light is reflected by one or more mirrors and hits the workpiece after at least the first region or the second region crosses the conveying path. According to the present aspect, after at least the first region or the second region crosses the conveying path, the laser light is reflected by one or more mirrors and hits the workpiece, so that the laser light is reflected back and applied to multiple any positions on the workpiece on the opposite side of the workpiece. Thus, the area of the multiple light emitting devices is reduced.

In a third embodiment, the laser processing system is a combination of the laser processing system according to the first embodiment and the laser processing system according to the second embodiment. According to the third embodiment, since the laser processing system is a combination of the laser processing system according to the first embodiment and the laser processing system according to the second embodiment, the relative positional accuracy in multiple positions on the workpiece is increased, and area of the light emitting device is reduced. In addition, since the optical path of the first light emitting device does not enter the second light emitting device adjacent to the first light emitting device, the damage to the second light emitting device by laser light emitted from the first light emitting device is avoided.

Light Emitting Device

The light emitting device (e.g., laser light source) is a device to emit laser light to a workpiece to process, and includes a light emitter (e.g., light source) to emit the laser light and a light scanner (e.g., galvano scanner or polygon mirror) to scan the workpiece with the laser light emitted from the light emitter. Preferably, the light emitter emits pulse laser light. The light emitter emits the laser light having an output power (i.e., light intensity) suitable for changing the property of at least one of the surface or the inside of the workpiece. In the light emitter, a control such as turning on and turning off the laser emission, frequency, or the intensity of the laser light is performed. For example, the light emitter emits the laser light having a wavelength of 355 nm to 1064 nm, a pulse width of 1 picoseconds (ps) to 10 nanoseconds (ns), or an average power of 10 to 50 W. The spot diameter of the laser light on which a region of the workpiece is processed is preferably from 1 μm or more to 200 μm or less, more preferably from 10 μm or more to 100 μm or less.

An example of the light scanner includes a deflector and an imaging optical system. An example of the deflector includes a galvano scanner (galvano mirror). An example of the imaging optical element includes an fθ lens.

Figure 9:
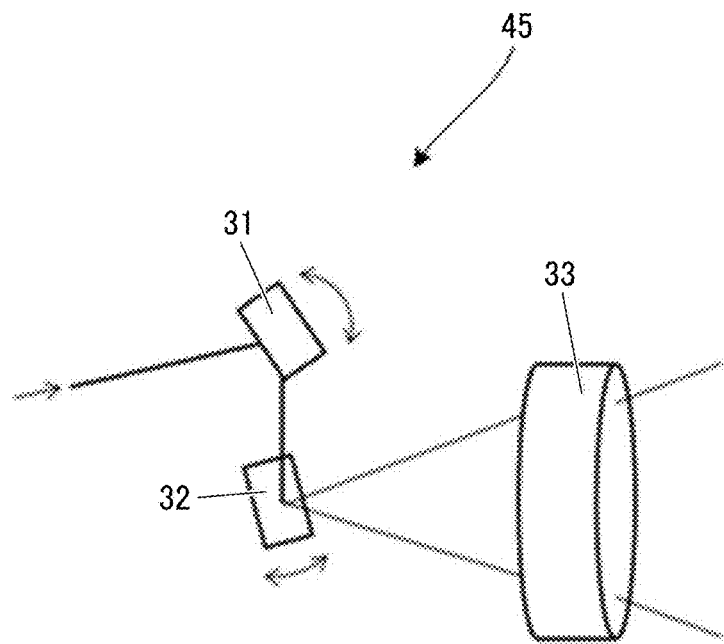
FIG. 9 is a diagram of the light scanner of the laser emitting device.

FIG. 9 is a diagram of the light scanning device as an example. The light scanner 45 illustrated in FIG. 9 includes a deflector (e.g., galvano scanner) and an imaging optical element. A galvano scanner as the deflector has a two-axial configuration, and includes an X-axis galvano scanner (first scan axis) and a Y-axis galvano scanner (second scan axis). The X-axis galvano scanner includes an X-axis galvanometer and a deflection mirror 31 rotatably attached to the top of the X-axis galvanometer. The Y-axis galvano scanner includes a Y-axis galvanometer and a deflection mirror 32 rotatably attached to the top of the Y-axis galvanometer. Herein, X-axis and Y-axis are interchangeable depending on the configuration of the galvano scanner. The two directions of the two deflection mirrors are orthogonal to each other. The two deflection mirrors scans the workpiece with the laser light at any position by rotating the deflection mirrors.

An fθ lens is used as the imaging optical element. As illustrated in FIG. 9, the fθ lens 33 focuses the laser light deflected by the deflectors on a position displaced from the center of the optical axis of the fθ lens 33 in proportion to an incident angle to the fθ lens 33.

Workpiece

The workpiece may be appropriately selected according to applications. In particular, there is no limitation as long as it can be laser-processed. Examples of the workpiece include a container such as a plastic bottle, for example, a polyethylene terephthalate (PET) bottle for beverage, a resin material on which a product, ingredients, an expiration date, a manufacturer logo, and a product name are indicated, a container made of resin and containing a liquid or solid, or a package.

Container

The storage container has a container body. The material, shape, size, structure, and color of the container body may be appropriately selected according to applications and are not particularly limited thereto. The material of the container body may be appropriately selected according to applications and is not particularly limited thereto. Examples of the material include resin, glass, or metals. Among these materials, resin and glass, specifically, transparent resin and glass are preferable, and the transparent resin is more preferable. Preferably, biodegradable resin may be used in recycling. Preferably, 100% biodegradable resin is used for the container. However, about 30% biodegradable resin may be used for the container. The environmental load is reduced by using such biodegradable resin. Examples of the resin of the container body include polyvinyl alcohol, polybutylene adipate terephthalate, polyethylene terephthalate succinate, polyethylene, polypropylene, polyethylene terephthalate, polyvinyl chloride, polystyrene, polyurethane, epoxy, polybutylene succinate, butylene adipate co-terephthalate, polyethylene-starch blend, poly(butylene succinate-co-terephthalate), polylactic acid, poly(3-hydroxybutyrate-co-3-hydroxyhexanoate), polyhydroxyalkanoate, Bio-PET 30, Bio-polyamide, Bio-PA1012, 10T, Bio-PA11T, MXD10, Bio polycarbonate, Bio polyurethane, Bio-Polyethylene, Bio-PET100, Bio-PA11, Bio-PA1010. These may be used alone or in combination thereof. Among these resins, biodegradable resins such as polyvinyl alcohol, polybutylene adipate terephthalate, and polyethylene terephthalate succinate are preferable in terms of the environmental load.

The shape of the container body may be appropriately selected according to applications and is not particularly limited thereto. Examples of the shape of the container body include bottle-shaped, prism-shaped, cylinder-shaped, box-shaped, or cone-shaped. Among these shapes, the bottle shaped is preferable. The bottle-shaped container body (i.e., bottle) has a finish portion (i.e., spout), a shoulder portion integrated with the finish portion, a sidewall portion integrated with the shoulder portion, and a bottom portion integrated with the sidewall portion. The size of the container body may be appropriately selected according to applications and not particularly limited thereto. The structure of the container body is not particularly limited and may be appropriately selected depending on the intended purpose. For example, the container body may have a single-layer structure or a multi-layer structure. Examples of the color of the container body include colorless transparent, colored transparent, and colored opaque.

Container Body

The product includes a container, a content stored in the container, and a sealing to seal the content in container, and other parts according to application.

Contents

Examples of the content include liquid, gas, and granular solid. Examples of the liquid include water, tea, coffee, black tea, and soft drink. When the content is a liquid beverage, the liquid beverage may be transparent, or have a color such as white, whitish, darker, black, brown, yellowish, or yellow. Examples of the gas include oxygen, hydrogen, and nitrogen. Examples of the granular solid include, pieces or granules of fruits, vegetables, nata de coco, tapioca, jelly, konjac (konnyaku, yam cake).

Sealing

The sealing seals the content in the container and is referred to as a container cap or a cap of the container. The material, shape, size, structure, and color of the sealing may be appropriately selected according to applications and are not particularly limited thereto.

A material of the sealing (i.e., sealing material) may be appropriately selected according to applications and is not particularly limited thereto. Examples of material include resin, glasses, metal, and ceramics. Among these materials, resin is preferably used in terms of mouldability. The sealing material of resin may be the same with material examples of the container body described above. The color of the sealing may be, for example, colored opaque, or colored transparent. The shape and size of the sealing may be appropriately selected according to applications, as long as the sealing seals the open or the content in the container body and are not particularly limited thereto.

The structure of the sealing may be appropriately selected according to applications and is not particularly limited thereto. For example, the sealing body preferably has a first portion that separates from the container body when the sealing is opened and a second portion that remains on the container body. Preferably, the first portion has a jagged portion on the surface as an anti-slip portion when opening the sealing. Preferably, the second portion has no jagged portion and a flat surface.

Conveying Step and Conveyor

The conveying step is a step of conveying the workpiece to the processing area by the conveyor unit. An example of the conveyor unit includes a belt conveyor.

Other Steps and Other Means

Other steps are not particularly limited and may be appropriately selected depending on the intended purpose. An example of other steps includes a control step. Other units are not particularly limited and may be appropriately selected depending on the intended purpose. An example of the other units includes a control unit (controller or circuitry).

Light Emitting Device

A light emitting device according to the present embodiment includes: a light emitter to emit laser light; and a light scanner to scan a region on the workpiece with the laser light emitted from the light emitter. The light emitting device includes multiple light emitting ports including a first light emitting port and a second light emitting port. First laser light is emitted from the first light emitting port and hits a first region to be processed on a workpiece (first processing surface), and second light beam is emitted from the second light emitting port and hits a second region to be processed on the workpiece (second processing surface). The first region and the second region are different regions on the workpiece. The normal direction of the first processing surface and the normal direction of the second processing surface have the angle difference.

In the light emitting device according to the present embodiment, one light emitting device includes multiple light emitting ports (first light emitting port and second light emitting port). First laser light is emitted from the first light emitting port and hits the first region of the workpiece and second laser light is emitted from the second light emitting ports and hits the second region on the workpiece. The first region and the second region are different regions on the workpiece. The normal direction of the processing surface of the first region and the normal direction of the processing surface of the second region have an angle difference. As a result, the conveyor is less likely to be complicated, the cost of the conveyor is reduced, and the relative positional accuracy is increased.

Embodiments of the present invention will be described in detail with reference to the drawings. In the drawings, the same components are denoted by the same reference numbers, and redundant description may be omitted. In addition, the number, position, and shape of the constituent members described below are not limited to those in the present embodiment, and can be set to the number, position, shape, and the like preferable for carrying out the present embodiment.

Figure 1B:
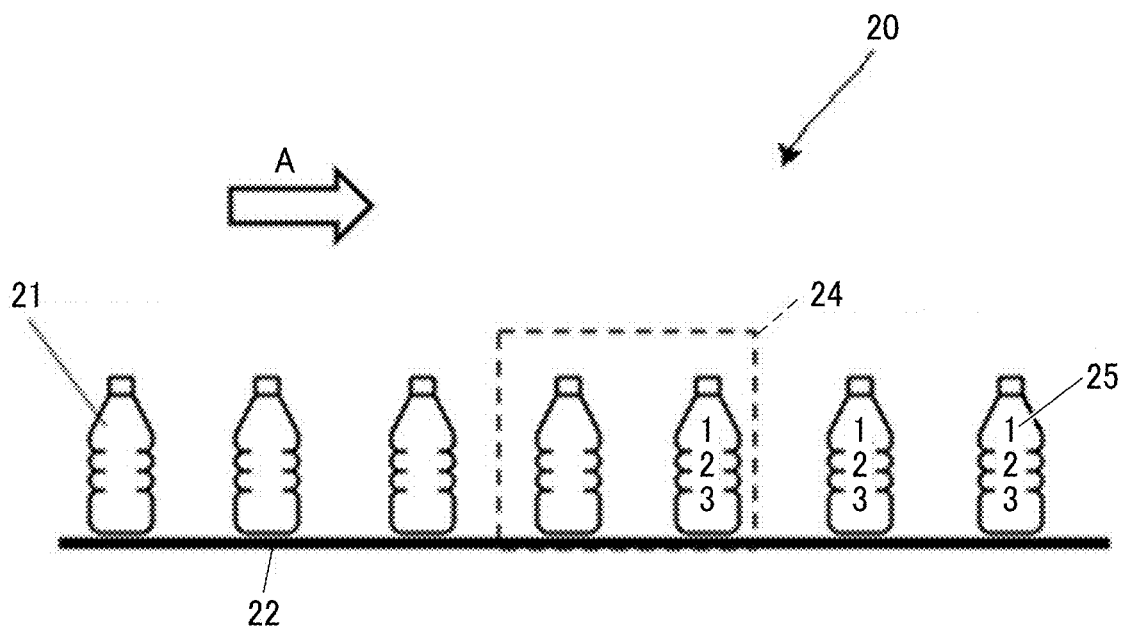
FIG. 1B is a side view the laser processing system in FIG. TA.

FIG. 1A is a plane view of a typical laser processing system to from a predetermined processing shape on the surface of the PET bottle. FIG. 1B is a side view the laser processing system in FIG. 1A; The laser processing system 20 illustrated in FIG. 1A and FIG. 1B includes a workpiece 21, a conveyor 22, and a light emitting device 23. The light emitting device 23 includes a light emitter (e.g., light source) to emit laser light and a light scanner to scan the workpiece with the laser light emitted from the light emitting device.

As illustrated in FIGS. 1A and 1B, PET bottles as workpieces 21 arranged at predetermined intervals are conveyed to a processing area 24 at a constant speed by a conveyor 22 in the conveying direction A. The PET bottles are arranged on a conveyor 22 with the longitudinal direction along the gravitational direction. The processing area 24 is determined by settings of an imaging optical element (e.g., an fθ lens) and a galvano scanner as a deflector as a light scanner of the light emitting device 23. The surface of the PET bottle, which is the surface to be processed, and the focal point of the fθ lens are substantially matched. A detection unit detects the position of the PET bottle conveyed in the processing area 24 to process at a predetermined position on the conveyor 22. In response to a predetermined delay time, the light emitting unit emits the laser light to the PET bottle as the workpiece 21 to process at the predetermined position. The laser processing is finished in the processing area 24 and the PET bottle having the processing shape 25 is conveyed to the following process by the conveyor 22 at a constant conveying speed.

A light emitting device includes: a light emitter to emit laser light; a light scanner to scan a workpiece with the laser light emitted from the light emitter; a first emitting port from which the laser light is emitted; and a second emitting port from which the laser light is mitted, the second emitting port being different from the first emitting port. The laser light emitted from the first emitting port is emitted to a first processing surface of a first region of the workpiece, the laser light emitted from the second emitting port is emitted to a second processing surface of a second region of the workpiece different form the first region, and a normal line of the first processing surface and a normal line of the second processing surface have an angle difference.

A light irradiator includes: a light emitter to emit laser light; a light scanner to scan a workpiece with the laser light emitted from the light emitter; a first emitting port from which the laser light is emitted; and a second emitting port from which the laser light is emitted, the second emitting port being different from the first emitting port. The laser light emitted from the first emitting port is emitted to a first processing surface of a first region of the workpiece, the laser light emitted from the second emitting port is emitted to a second processing surface of a second region different form the first region of the workpiece, and a normal direction of the first processing surface and a normal direction of the second processing surface have an angle difference.

First Embodiment

Figure 2A:
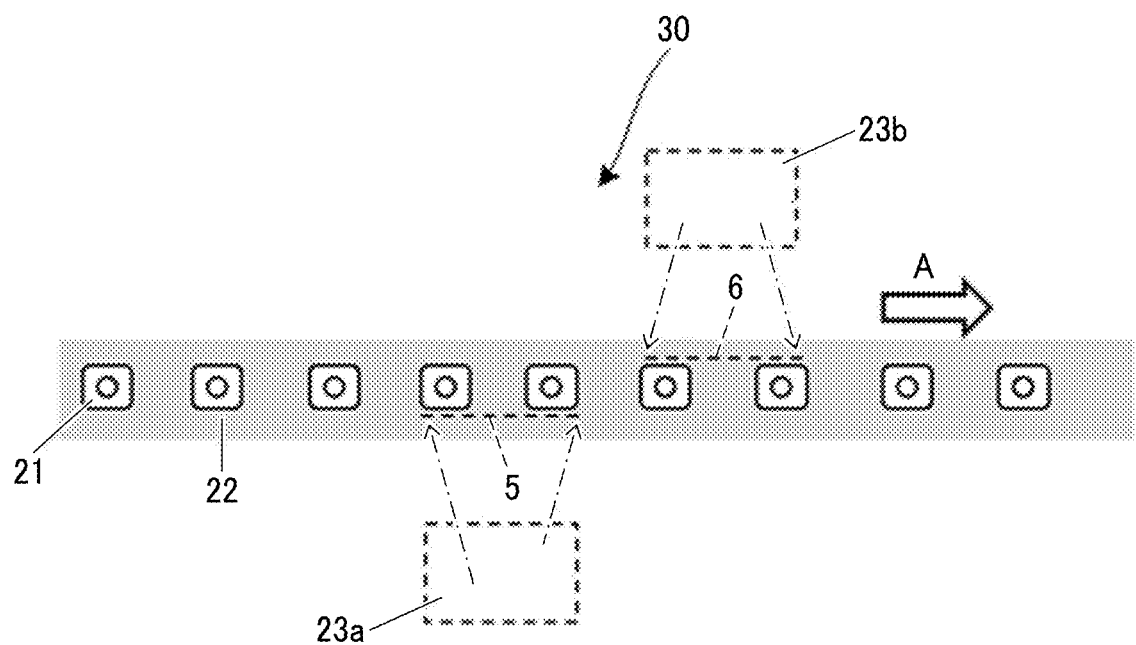
FIG. 2A is a plan view of a laser processing system to form predetermined shapes at different positions on the surface of the PET bottle as a workpiece according to the second embodiment.
Figure 2B:
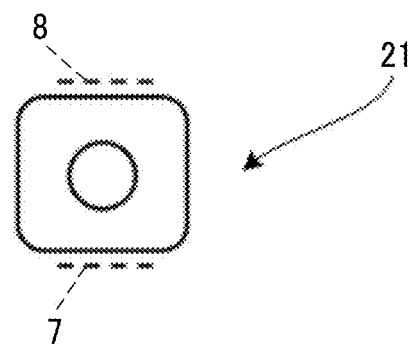
FIG. 2B is a partially enlarged view of two processing regions on the workpiece of FIG. 2A.

FIG. 2A is a plan view of an example of a laser processing system of the first embodiment for performing laser processing at different positions on the PET bottle as a workpiece 21, and FIG. 2B is a partially enlarged view of two processing regions on the workpiece of FIG. 2A.

In the laser processing system 30 illustrated in FIG. 2A, two light emitting devices (a first light irradiator 23a and a second light irradiator 23b) are disposed at the opposite sides of the conveyor 22 each other to perform processing at different positions on the PET bottle as a workpiece 21. The first light irradiator 23a includes a light emitter (light source) to emit the laser light 3 and a light scanner including, for example, a galvano scanner and an fθ lens, and works in a processing region 5. The second light irradiator 23b includes a light emitter (light source) to emit the laser light 3 and a light scanner including, for example, a galvano scanner and an fθ lens, and works in a processing region 6. The two light emitting devices (i.e., the first light irradiator 23a and the second light irradiator 23b) are disposed at different sides of the conveyor 22. In other words, the conveyor is disposed between the first light irradiator 23a and the second light irradiator 23b. The optical axis of the first light irradiator 23a and the optical axis of the second light irradiator 23b face each other (i.e., opposite direction) and toward the conveyor 22 (conveying direction A).

A laser processing system includes: a first light irradiator including: a first light emitter to emit first laser light; and a first light scanner to scan a first region of a workpiece with the first laser light emitted from the first light emitter; a second light irradiator including: a second light emitter to emit second laser light; and a second light scanner to scan a second region of the workpiece different from the first region of the workpiece with the second laser light emitted from the second light emitter. The first light irradiator emits the first laser light to the first region of the workpiece in a first irradiation direction, the second light irradiator emits the second laser light to the second region of the workpiece in a second irradiation direction opposite to the first irradiation direction (a laser processing system having a opposite configuration).

The processing regions 5 and 6 substantially coincide with the focal plane of the fo lens, and the focal plane is substantially parallel to the conveying direction A of the PET bottle as a workpiece 21. The position of the PET bottle as a workpiece 21 conveyed by the conveyor 22 is detected by a detection system and, processing is performed in the processing region 5 by the first light irradiator 23a after a predetermined time lag. After finishing the processing, the PET bottle is conveyed by the conveyor 22 and processed in a processing region 6 of the second light irradiator 23b. While the PET bottle as a workpiece 21 is conveyed from the processing region 5 to the processing region 6 by the conveyor 22, the orientation of the PET bottle as a workpiece 21 does not change in a direction other than the conveying direction A of the PET bottle, and the first light irradiator 23a processes while maintaining the orientation of the PET bottle with the second light irradiator 23b. As illustrated in FIG. 2B, the processing region 7 processed by the first light irradiator 23a and the processing region 8 processed by the second light irradiator 23b are positioned at different places on the PET bottle as a workpiece 21. The first light irradiator 23a and the second light irradiator 23b are adjacent to each other in the conveying direction A of the PET bottle, and the processing region 5 and the processing region 6 are set closer to each other in the conveying direction A. Since the processing in the processing region 5 and the processing in the processing region 6 are temporally shifted from each other, when the orientation of the PET bottle as a workpiece 21 is changed during the time, the relative position of the processing region is shifted from the predetermined target. Thus, by making the distance in the conveying direction between the processing region 5 and the processing region 6 as short as possible and making the time difference in processing as small as possible, the PET bottle as a workpiece 21 is conveyed to the processing region 6 while maintaining the orientation of the PET bottle in the processing region 5, and to reduce the variation in the relative position between the processing region 7 and the processing region 8.

In the laser processing system, the second light irradiator is disposed on a downstream of the first light irradiator in the conveying direction, the conveyor conveys the workpiece while maintaining orientation of the workpiece constant from a light emitting start position, at which the first light irradiator starts irradiation of the first region of the workpiece, to a light emitting end position, at which the second light irradiator ends irradiation of the second reaction of the workpiece.

In the laser processing system, the conveyor contacts a setting surface of the workpiece different from the first region and the second region and does not contact the first region and the second region of the workpiece.

In the laser processing system, the conveyor contacts a setting surface of the workpiece different from the first region and the second region and does not contact the first region and the second region of the workpiece.

Second Embodiment

Figure 3:
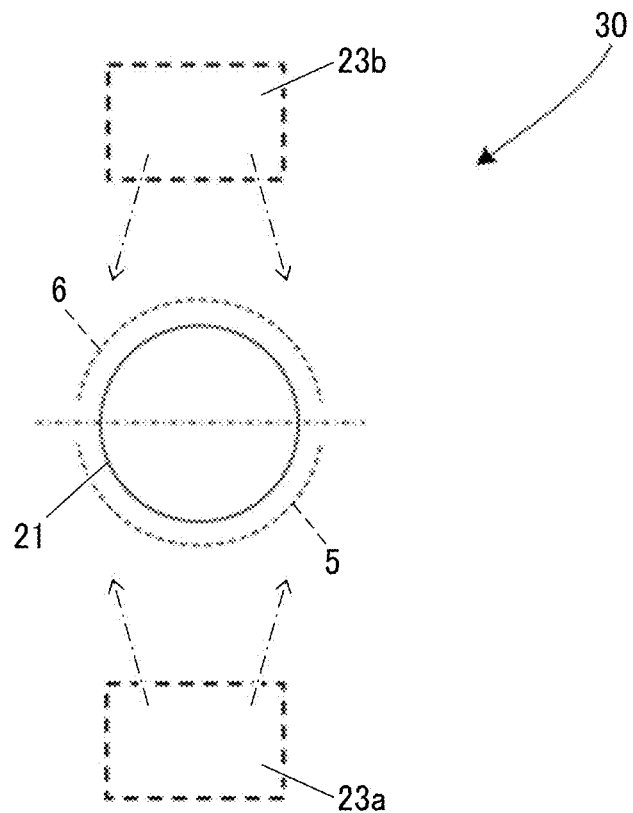
FIG. 3 is a diagram of processing regions on a PET bottle as a workpiece in the first light emitter and the second light emitter.

FIG. 3 is a diagram of processing regions on a PET bottle as a workpiece 21 in the first light irradiator 23*a* and the second light irradiator 23*b*; The first light irradiator 23*a* and second light irradiator 23*b* are arranged at both sides of the conveyor 22 so that optical axes of the light emitting devices are opposite each other. Thus, the light emitting devices processes the entire circumferential region of the PET bottle as a workpiece 21. As illustrated in FIG. 3, the first light irradiator 23*a* processes the processing region 5 as a half of the circumference of the PET bottle (i.e., 180°), and the second light irradiator 23*b* processes the processing region 6 (i.e., the remaining 180°). In other words, the second light irradiator 23*b* processes the region in which the first light irradiator 23*a* cannot reach the light.

In the laser processing system, the first light irradiator includes a first emitting port to emit the first laser light, the second light irradiator includes a second emitting port to emit the second laser light, and the conveyor is disposed between the first emitting port and the second emitting port.

Figure 4A:
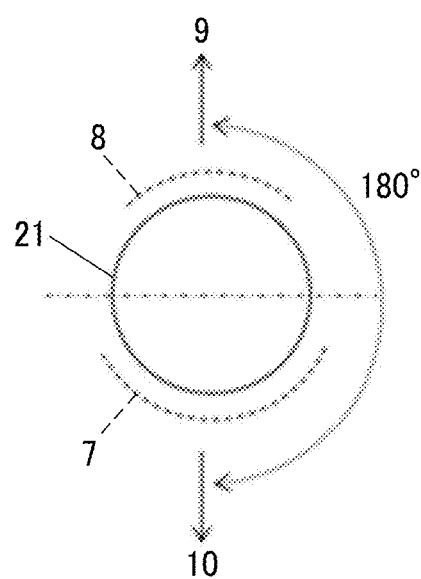
FIG. 4A is a diagram of processing regions on a PET bottle as a workpiece and an angle difference in the processing regions.
Figure 4B:
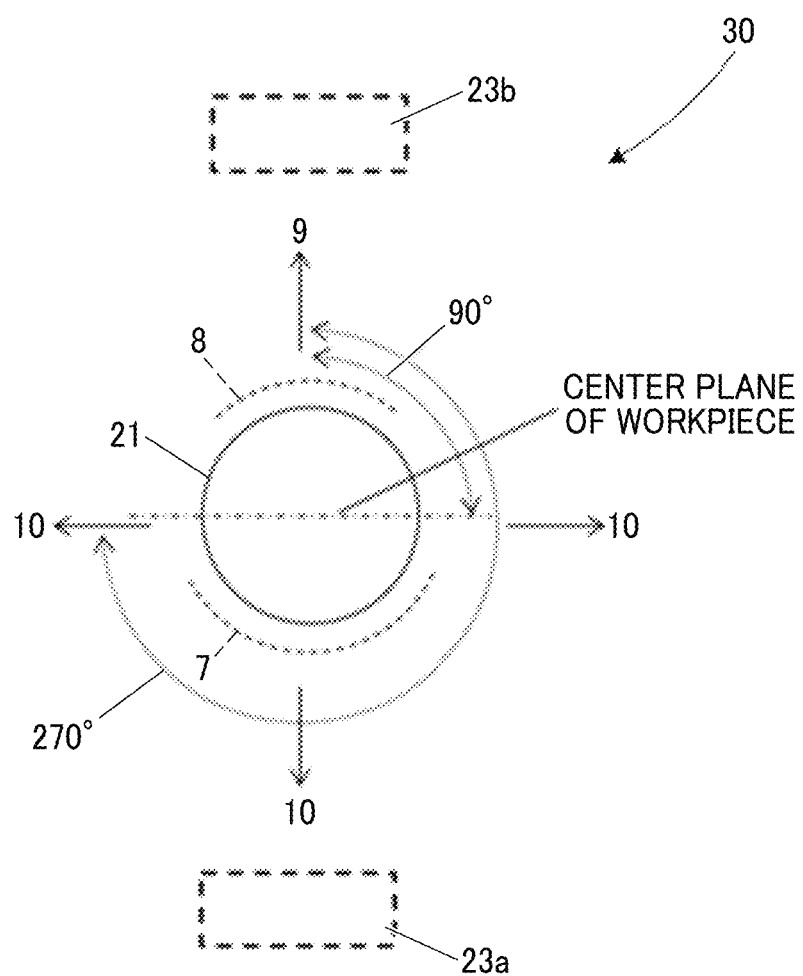
FIG. 4B is a diagram of the first light emitting device, the second light emitting device, and the processing regions on the PET bottle.

FIG. 4A is a diagram of processing regions and normal directions on a PET bottle as a workpiece 21. FIG. 4B is a diagram of the first light irradiator 23*a*, the second light irradiator 23*b*, and the processing regions. In FIG. 4A, the normal line in the processing region 7 of the PET bottle as a workpiece 21 processed in the processing region 5 in FIG. 3 is defined as a normal line 10, and the normal line in the processing region 8 processed in the processing region 6 is defined as a normal line 9. The normal line in the processed region is defined by averaging normal lines in the entire processed region. In FIG. 4A, the angle difference between the normal line 9 and the normal line 10 is 180°. As illustrated in FIG. 4B, the processing region 8 has the normal line 9 and fixed. Depending on setting of the processing region 7, the angle range of the normal line 10 of the processing region 7 is from 90° to 270°. Thus, the remaining angle difference in the normal line of 270° to 360° or 0° to 90° covers the processing region 6, and the second light irradiator 23*b* processes the remaining angle. In such a way, the first light irradiator 23*a* processes the processing region having a range of 90° to 270° in the angle difference of the normal direction and the second light irradiator 23*b* processes a processing region having a range of 270° to 360° or 0° to 90° in the angle difference of the normal line with respect to a processing region among multiple processing regions on the PET bottle as a workpiece 21 so that the optical axis of the first light irradiator 23*a* incident on the PET bottle and the optical axis of the second light irradiator 23*b* incident on the PET bottle each other and the processing surfaces are provided with the both side when defining the center of the PET bottle. Thus, a simple configuration without a rotation mechanism of the PET bottle and the phase matching control thereof is achieved due to the configuration illustrated in FIG. 3, and both sides of the PET bottle are processed.

In the laser processing system, a first normal direction of a first processing surface of the first region and a second normal direction of a second processing surface of the second region have an angle difference.

In the laser processing system, the angle difference is 90° or more and 270° or less.

The laser processing system further includes a conveyor to convey the workpiece in a conveying direction. The first light irradiator and the second light irradiator are disposed at the same position in the conveying direction and facing each other across the conveyor.

In the laser processing system, the first laser emitting device and the second light emitting device are disposed on different positions along the conveying direction.

In the laser processing system, the first light emitting device and the second light emitting device are disposed on a same position along the conveying direction and facing each other across the conveyor.

The laser processing system further includes a conveyor to convey the workpiece in a conveying direction. The first light irradiator and the second light irradiator are disposed at different positions in the conveying direction.

Third Embodiment

Figure 5:
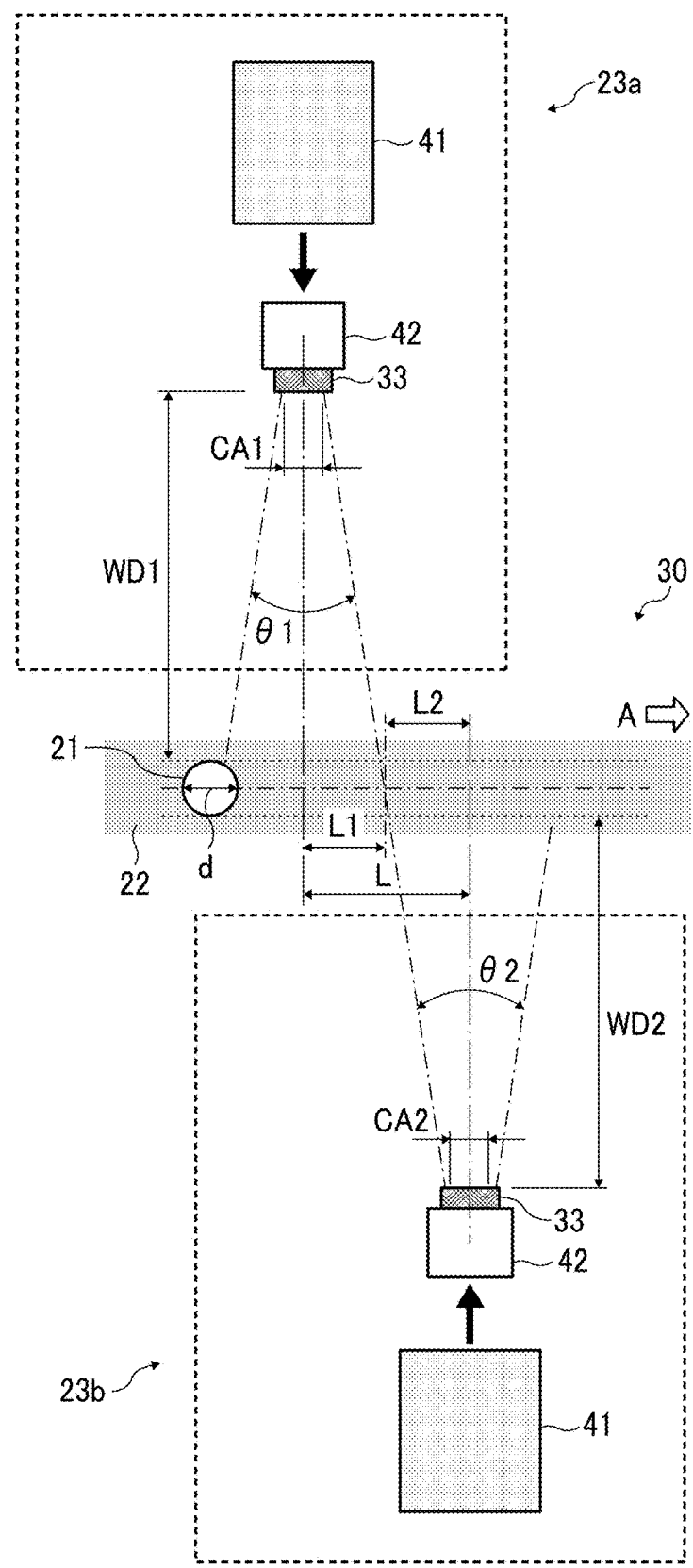
FIG. 5 is a diagram of a configuration of the first light emitting device and the second light emitting device adjacent to a conveyor.

FIG. 5 is a diagram of a configuration of a first light irradiator 23*a*, a second light irradiator 23*b*, and the conveying direction A. As illustrated in FIG. 5, the first light irradiator 23*a* and the second light irradiator 23*b* are disposed across the conveyor 22 each other and adjacent to the conveyor 22. The first optical axis of the first light irradiator 23*a* and the second optical axis of the second light emitting device are opposed to each other. If the distance along the conveying direction between the first light irradiator 23*a* and the second light irradiator 23*b* is shorter, one optical axis enters the other light emitting device within the scanning angle of view, and the light emitting device is damaged by the emission of the laser light. When the damage of the light emitting device occurs, the conveyance of the PET bottle as a workpiece 21 is stopped depending on the damaged region, and the operation rate of the manufacturing process is lowered, and the productivity is significantly decreased. Thus, when the first light irradiator 23*a* and the second light irradiator 23*b* are disposed across the conveyor 22 each other as illustrated in FIG. 5, the optical path is arranged so that the other light emitting device in the scanning optical path. The first light irradiator 23a and the second light irradiator 23b satisfy the expression (Ta) below. Since the optical configuration satisfies the expression (Ta), the optical axis of the first light irradiator 23a does not enter the second light irradiator 23b, and a damage to the light emitting devices due to laser light emission is avoided.

$$L > L1 + L2, \quad (1a)$$

where L is the length (mm) between the center of the optical axis of the first light irradiator 23a and the center of the optical axis of the second light irradiator 23b, L1 is the length (mm) in the conveying direction from the center of the optical axis of the first light emitting device to the center position of the PET bottle as a workpiece 21 at the maximum scanning angle, and L2 is the length (mm) in the conveying direction from the center of the optical axis of the second light irradiator 23b to the center position of the PET bottle as the workpiece 21 at the maximum scanning angle.

Herein, L1 and L2 are expressed by the expressions (2) and (3) below.

$$L1 = (WD1 + d/2) \times \tan(\theta 1/2) + CA1/2, \quad (2)$$

where θ1 is the deflection angle (°) of the galvano scanner serving as the first deflector, WD1 is the working distance (mm) of the fθ lens serving as the first imaging optical element, CA1 is the aperture size (mm) of the fθ lens serving as the first imaging optical element, and d is the maximum size (mm) of the PET bottle as a workpiece are given.

$$L2 = (WD2 + d/2) \times \tan(\theta 2/2) + CA2/2, \quad (3)$$

where θ2 (°) is the deflection angle of the galvano scanner serving as the second deflector, WD2 (mm) is the working distance of the fθ lens serving as the second imaging optical element, CA2 is the aperture size (mm) of the fθ lens serving as the second imaging optical element, and d (mm) is the maximum size of the PET bottle serving as a workpiece.

Fourth Embodiment

Figure 6:
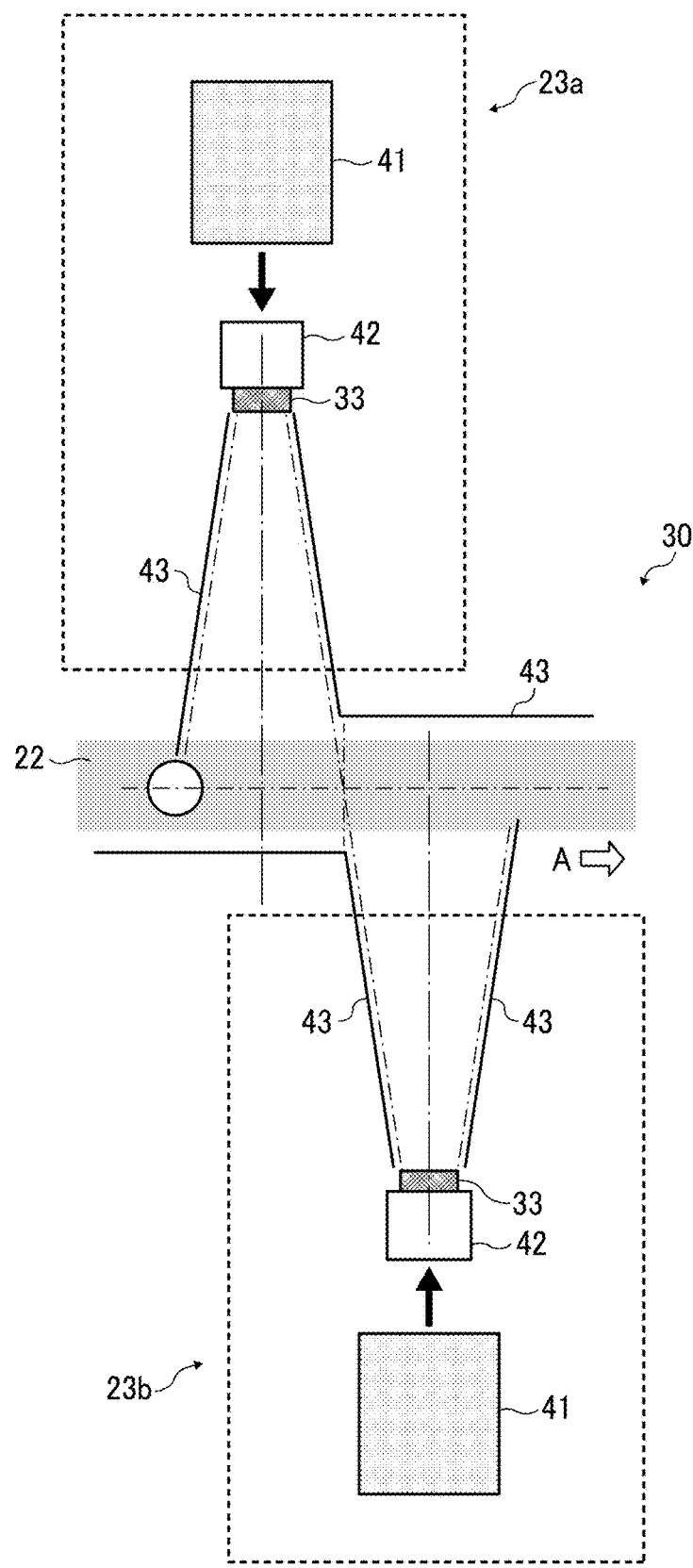
FIG. 6 is a diagram of configuration of the first light emitting device, the second light emitting device, and a light shield provided between the first light emitting device and the second light emitting device along the conveyor.

FIG. 6 is a diagram of a laser processing system in which a first light emitting device and a second light emitting device are disposed adjacent to each other along a conveying direction. In other words, the conveyor is disposed between the first light irradiator 23a and the second light irradiator 23b. In the laser processing system in FIG. 6, the light shield is provided between the first light irradiator 23a and the second light irradiator 23b. As illustrated in FIG. 5, even if the first light irradiator 23a is arranged so that the optical axis of the first light emitting device does not enter the second light irradiator 23b, the laser light emitted by an error of the galvano scanner or an error of the PET bottle detector (e.g., laser emission at a position without the PET bottle) passes through without hitting the PET bottle and is reflected at an unintended place to enter the second light irradiator 23b. Thus, as illustrated in FIG. 6, the light shield 43 provided between the first light irradiator 23a and the second light irradiator 23b shields an unintended optical path so that laser light from the first light irradiator 23a does not enter the second light irradiator 23b. Herein, the first light emitting device and the second light emitting device are interchangeable. As the light shield 43, preferably, an aluminum material has black alumite treatment on its surface.

The laser processing system further includes: a light shield between the first light irradiator and the second light irradiator.

In the laser processing system, the light shield includes: a first light shield adjacent to the first region along the conveying direction, the first light shield to block the first laser light emitted from the first light irradiator to enter the second light irradiator; and a second light shield adjacent to the second region along the conveying direction, the second light shield to block the second laser light emitted from the second light irradiator to enter the first light irradiator.

Fifth Embodiment

Figure 7A:
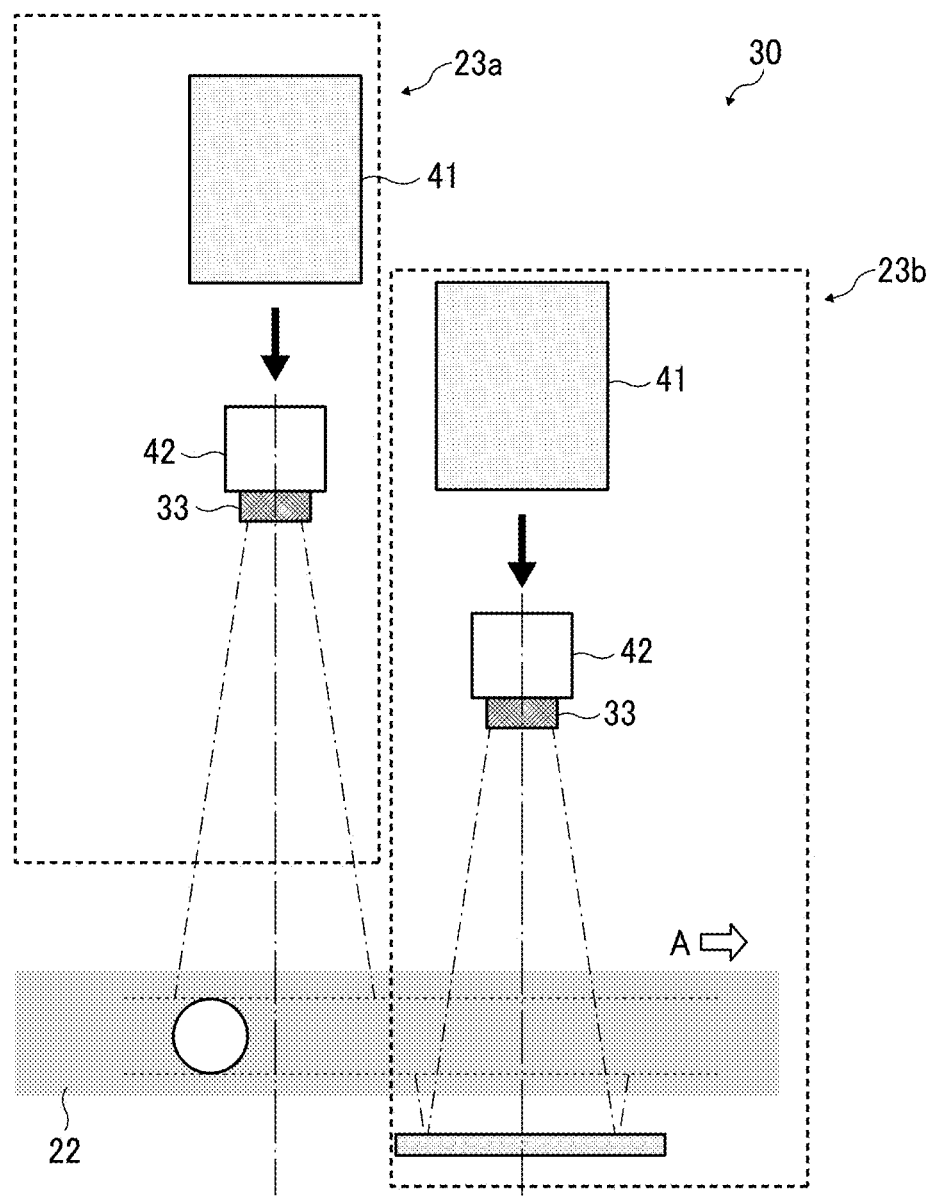
FIG. 7A is a diagram of a configuration of the first emitting device and the second emitting device at the same side with respect to the conveyor, and the laser emission ports of the first and second light emitting device are at the same side.
Figure 7B:
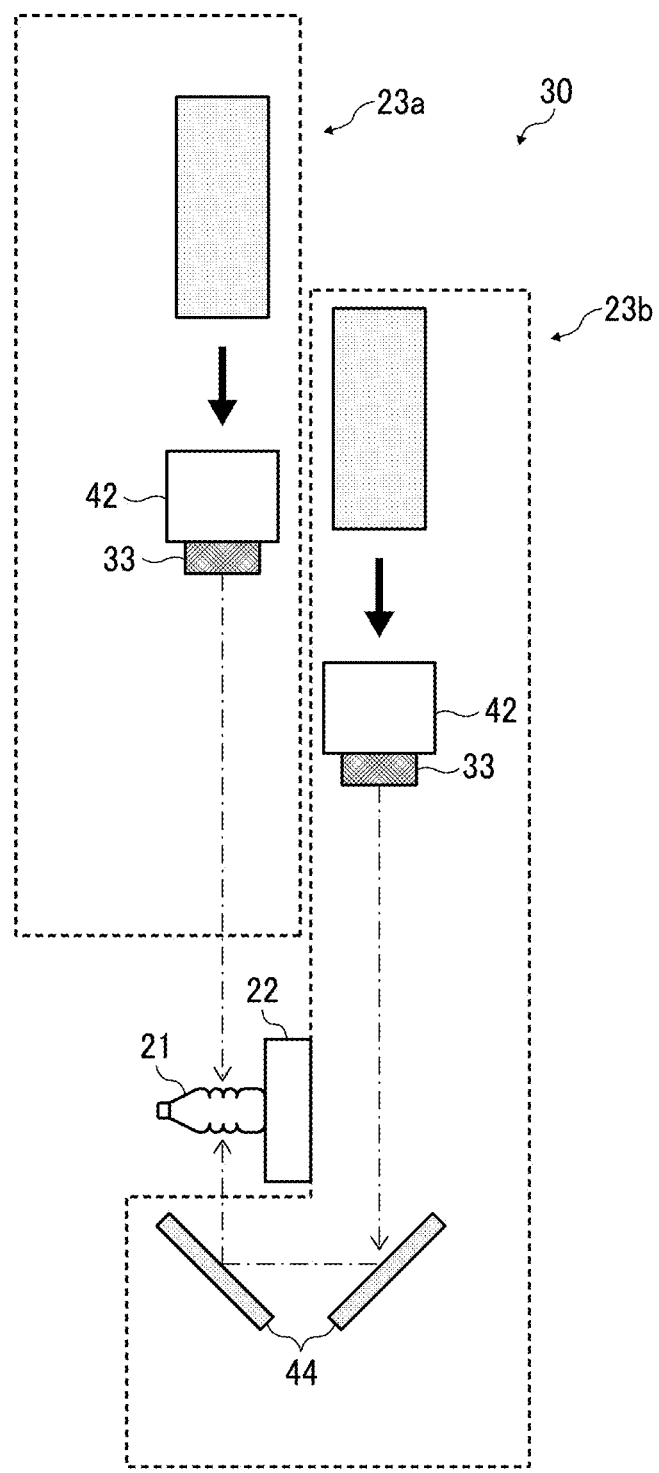
FIG. 7B is another diagram of a configuration of the first emitting device and the second emitting device at the same side with respect to the conveyor, and the laser emission ports of the first and second light emitting device are at the same side.

FIG. 7A is a diagram of a configuration of the first emitting device and the second emitting device at the same side with respect to the conveyor, and the laser emission ports of the first and second light emitting device are at the same side. In a PET bottle manufacturing process or a PET bottle beverage manufacturing process, PET bottles are conveyed on a conveyor 22, which is one of the transporting means, and are shipped through various processes along the conveying path. Since the transporting path has a longer distance in order to cope with various processes, reduction in the area of the apparatus in each process leads to reduction in the floor area of the entire manufacturing process. In FIG. 7A, the first light irradiator 23a includes the light emitter 41 (first light emitter) to emit laser light, and the second light irradiator 23b includes the light emitter 41 (first light emitter) to emit laser light. The light emitter 41 (first light emitter) and the light emitter 41 (second light emitter) are disposed at the same side with respect to the conveyor 22. The first deflector deflects the laser light emitted from the light emitter 41 (first light emitter) as first scanning light. The first scanning light passing through the fθ lens directly propagates toward the PET bottle to process. The second deflector deflects the laser light emitted from the light emitter 41 (second light emitter) as second scanning light. The second scanning light passing through the fθ lens propagates across the conveyor 22 and returns in the opposite direction by the bending mirror 44, and directly propagates toward the PET bottle to process. As illustrated in FIG. 7A, the second scanning light of the second light irradiator 23b crosses the conveyor 22. In order to cross the second scanning light without hitting the conveyor 22, the center of the optical axis passing through the fθ lens 33 is disposed at a position higher or lower than the conveyor 22 including the PET bottle as illustrated in FIG. 7B so that the second scanning light passes through the space above or below the conveyor 22 and is reflected by the bending mirror 44 to be adjusted to a predetermined height. Since the laser processing system adopts such a configuration, the different light emitting devices process the different regions on the same PET bottle, and the area for laser processing by the light emitting device is arranged at one side of the conveyor to acquire a latitude of the conveying path.

In the laser processing system, the first light irradiator includes a first emitting port to emit the first laser light, the second light irradiator includes a second emitting port to emit the second laser light, and the first emitting port and the second emitting port are at a same side of the conveyor.

The laser processing system further includes a bending element to bend the second laser light emitted from the second emitting port to the second irradiation direction opposite to the first irradiation direction (a laser processing system having a bending configuration).

In the laser processing system, the bending element is a mirror to reflect the laser light.

The laser processing system includes the laser processing system having a opposite configuration combined with the laser processing system having a bending configuration.

A light irradiator includes: a light emitter to emit laser light; a light scanner to scan a workpiece with the laser light emitted from the light emitter; a first emitting port from which the laser light is emitted; and a second emitting port from which the laser light is emitted, the second emitting port being different from the first emitting port. The laser light emitted from the first emitting port is emitted to a first processing surface of a first region of the workpiece, the laser light emitted from the second emitting port is emitted to a second processing surface of a second region different form the first region of the workpiece, and a normal direction of the first processing surface and a normal direction of the second processing surface have an angle difference.

Sixth Embodiment

Figure 8:
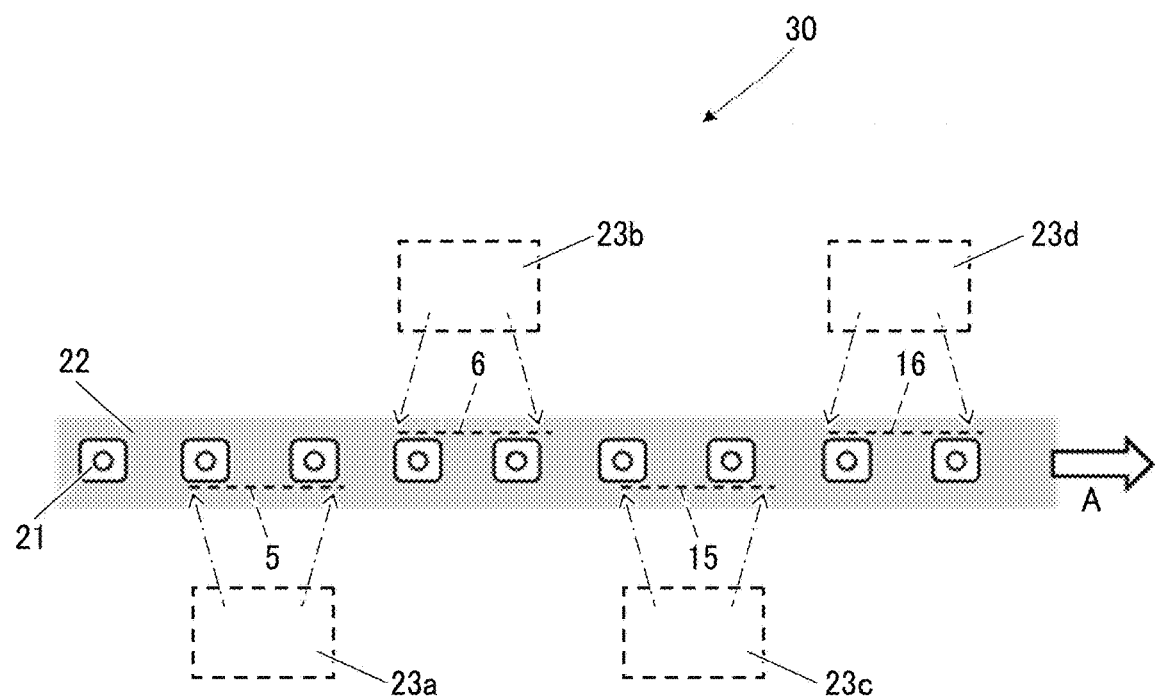
FIG. 8 is a diagram of a laser processing system in which multiple pairs of the light emitting devices are arranged.

FIG. 8 is a diagram of a laser processing system in which multiple two adjacent light emitting devices are arranged. In the laser processing system 30 illustrated in FIG. 8, the first light irradiator 23*a* and the second light irradiator 23*b* are disposed adjacent to each other along the conveying direction, and process different regions in the same PET bottle. In addition, the third light irradiator 23*c* and the fourth light emitting devices 23*d* are arranged at the downstream along the conveying direction and process another PET bottle different from the PET bottle processed by the first light irradiator 23*a* and the second light irradiator 23*b*. The operations of the third light irradiator 23*c* and the fourth light irradiator 23*d* are identical to those of the first light irradiator 23*a* and the second light irradiator 23*b*, and the PET bottle to be processed is different. In a case where only the first light irradiator 23*a* and the second light irradiator 23*b* are not enough to process for higher productivities, the third light irradiator 23*c* and the fourth light irradiator 23*d* are added as a pair to increase the productivities. A detection system for PET bottle position detection used in the third light irradiator 23*c* and the fourth light irradiator 23*d* may be a signal used in the first light irradiator 23*a* and the second light irradiator 23*b*. An additional direction system may be separately provided with the downstream of the second light irradiator 23*b* along the conveying direction, and a detection signal from the additional detection system may be used.

In the laser processing system, the first light irradiator includes multiple first light irradiators, the second light irradiator includes multiple second light irradiators, and the multiple first light irradiators are respectively paired with the multiple second light irradiators.

The laser processing system includes the laser processing system having a opposite configuration combined with the laser processing system having a bending configuration.

Since the laser processing system of the present embodiment has the configuration described above, multiple processing regions around a PET bottle is processed without providing a PET bottle rotation mechanism on a conveyance line. Since the laser processing system does not use the positioning mechanism and the rotation mechanism, the cost of the laser processing apparatus is reduced. In addition, the system does not user, for example, phase control of rotation, a control configuration becomes simpler. Since the time difference in starting process becomes shorter due to the configuration, and the orientation of the PET bottle while conveying during the time difference in starting process is maintained, the relative positional accuracy among the processing parts is increased. Further, since multiple light emitting devices process multiple different processing regions on the PET bottle, the processing time is reduced. Thus, the productivity is increased.

Figure 10:
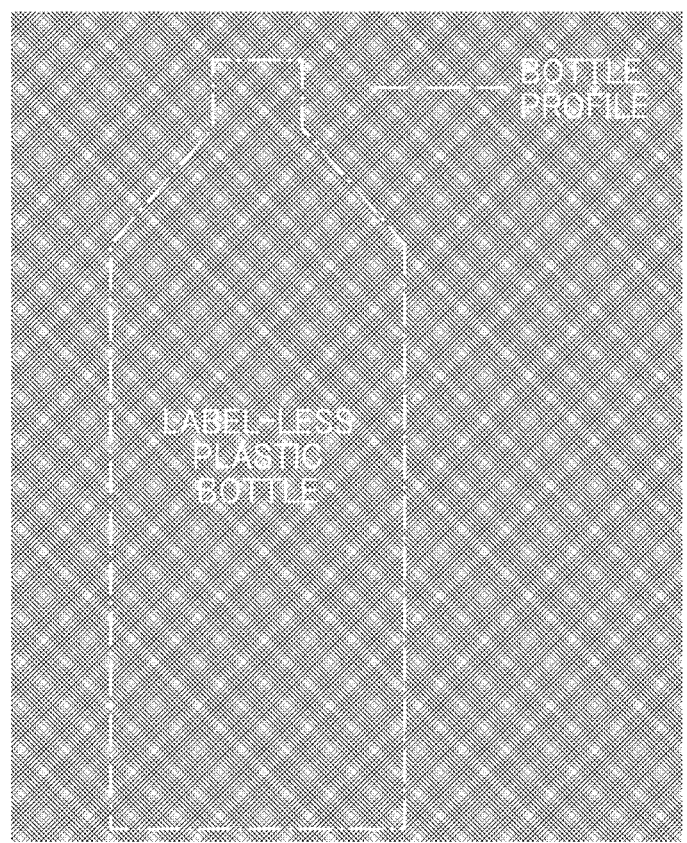
FIG. 10 is a diagram of an external appearance of the container as an example.
Figure 11:
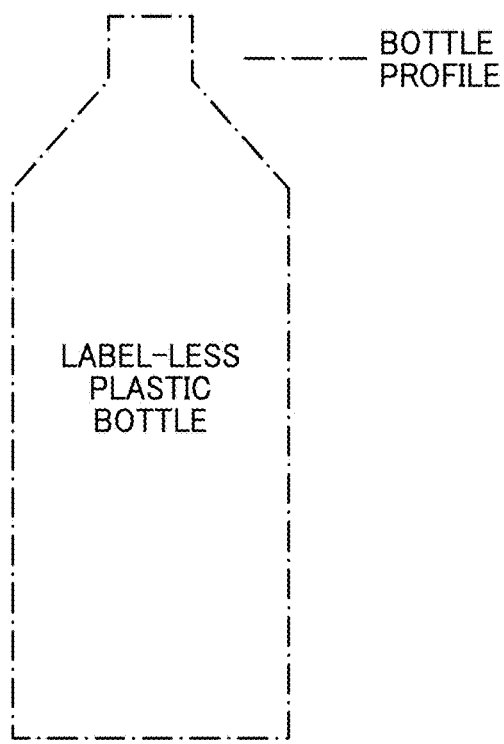
FIG. 11 is a diagram of external appearance of the container as another example.
Figure 12:
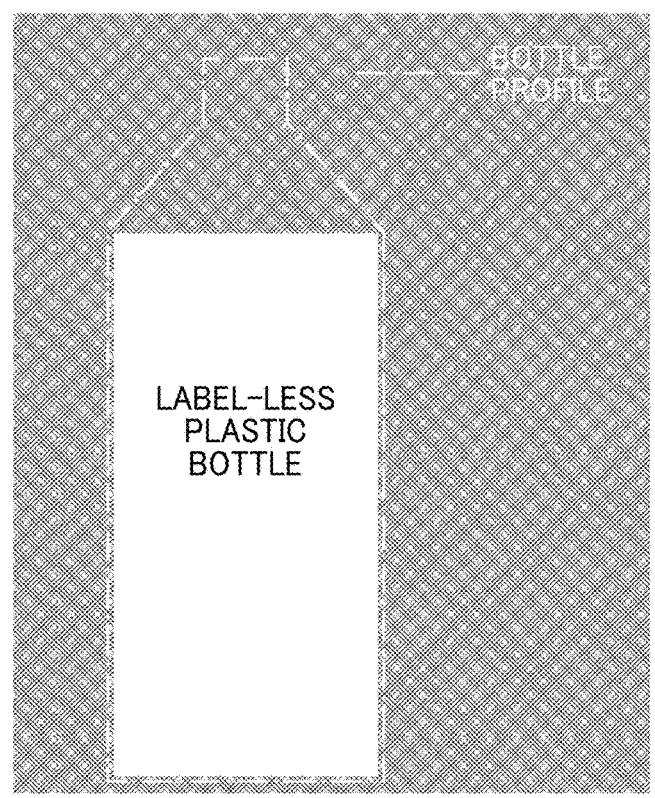
FIG. 12 is a diagram of an external appearance of the container as yet another example.

FIG. 10 is an example of the external appearance of the container (i.e., the object to be processed) used in the present embodiment. In the example, the container contains a whitish content, or the background is darker, and the printed portion (i.e., string) is whitish. The printed portion forms an image (i.e., string) by changing the surface property of the container. In FIG. 10, the content or the background is darker or black, and the printing surface is whitish or white. In contrast, in FIG. 11, the content is whitish or white, and the printing surface is darker than the non-printing surface by decreasing the transmissivity of the printing surface as compared with that of the non-printing surface. As illustrated in FIG. 12, an aggregate of minute dots (microstructures) may be formed on the non-printing portion.

Figure 13:
FIG. 13 is a diagram of a surface property change caused by laser emission.
Figure 13:
Figure 13:
Figure 13:
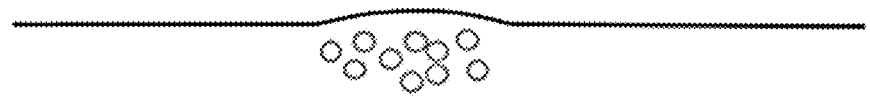

The surface property change that forms each minute dot on the surface of the container body is shape change or physical change. Using some means to change the property, the minute dot is formed by at least any one of the shape change or the physical change. Examples of the surface property change by laser emission are illustrated in FIG. 13. The surface property change illustrated in FIG. 13 is an example and is not limited thereto as long as the surface property has an optical property. For example, yellowing of the resin material, cutting, or oxidation reaction may also be used.

Figure 14A:
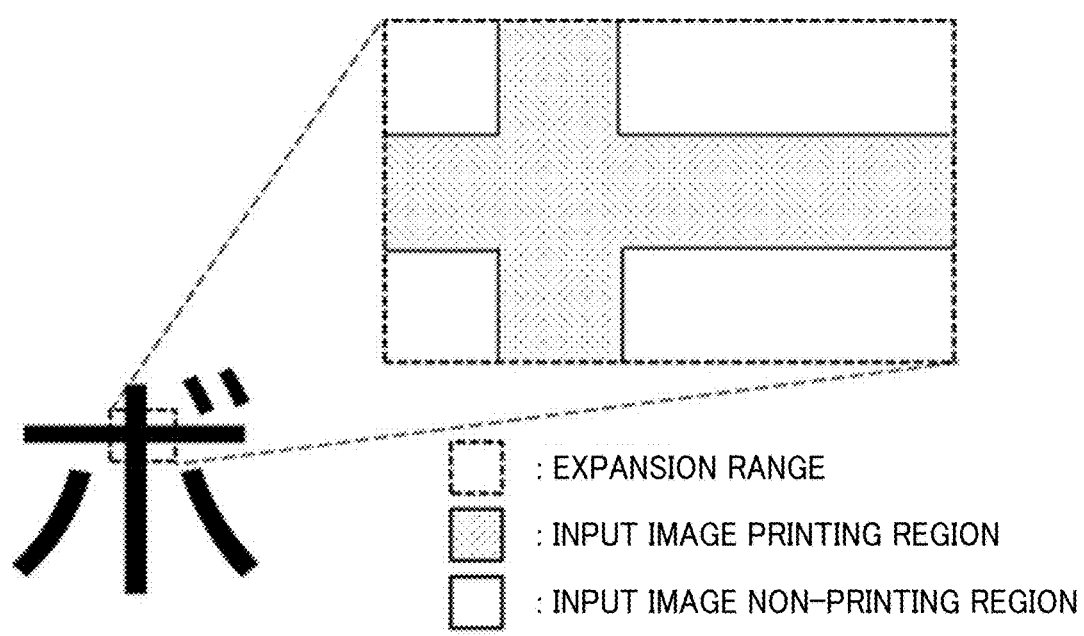
FIG. 14A is an enlarged view of a portion of a character formed by an aggregate of minute dots formed by changing the surface property.
Figure 14B:
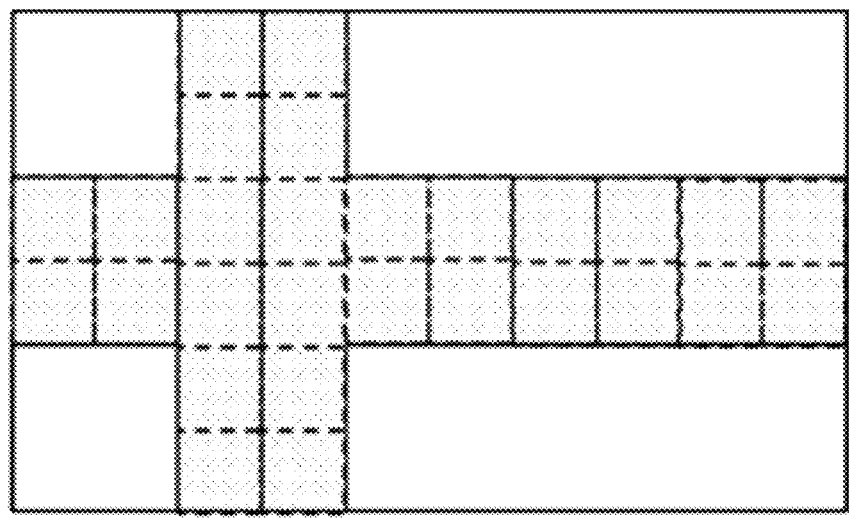
FIG. 14B is a diagram of the portion of the character formed by an aggregate of minute square dots formed by changing the surface property.
Figure 14C:
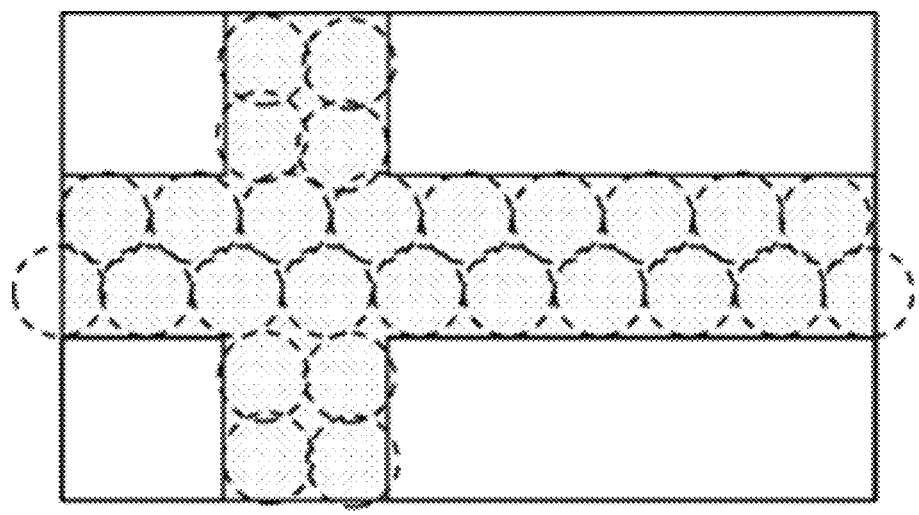
FIG. 14C is a diagram of the portion of the character formed by an aggregate of minute circular dots formed by changing the surface property.
Figure 14D:
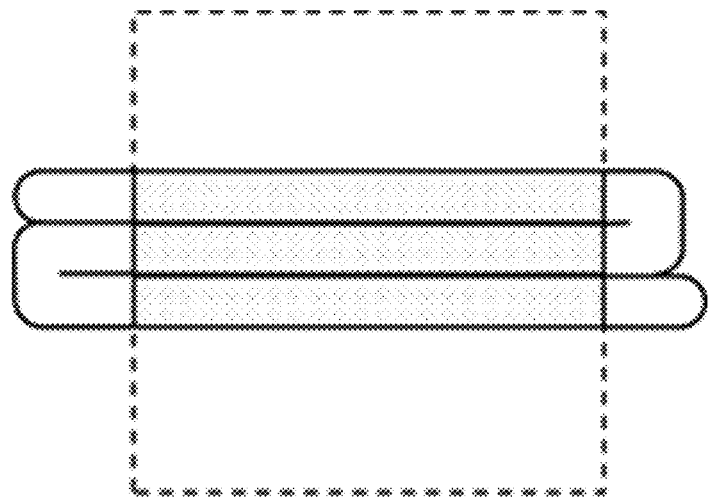
FIG. 14D is a diagram of a one-stroke pattern printed by an aggregate of minute lines formed by changing the surface property.

FIGS. 14A to 14D are enlarged images of the printed portion formed by the aggregating minute dots by surface property change on the surface of the container. FIG. 14A is an enlarged image of the printed portion. As illustrated in FIG. 14B, any portion of the printing portion is formed by multiple minute dots. In FIG. 14B, the vertical line or the horizontal line on the printing portion has a line width of two-minute dots. But the line width is not limited to two-minute dots. In the present embodiment, the shape of the minute dot is square, but is not limited thereto. Depending on conditions of the laser processing, the shape of the minute dot may be circular illustrated in FIG. 14C. The shape of the minute dot (microstructure) is not particularly limited thereto. Depending on the characters printed on the workpiece or a positional condition, an arrangement of the aggregate may be appropriately changed. The minute dots or the microstructures may be aggregate at different timings in a certain area. In some embodiments, the arrangement of the aggregate of the microstructure includes a single line bent several times as an aggregate as illustrated in FIG. 14D.

Figure 15A:
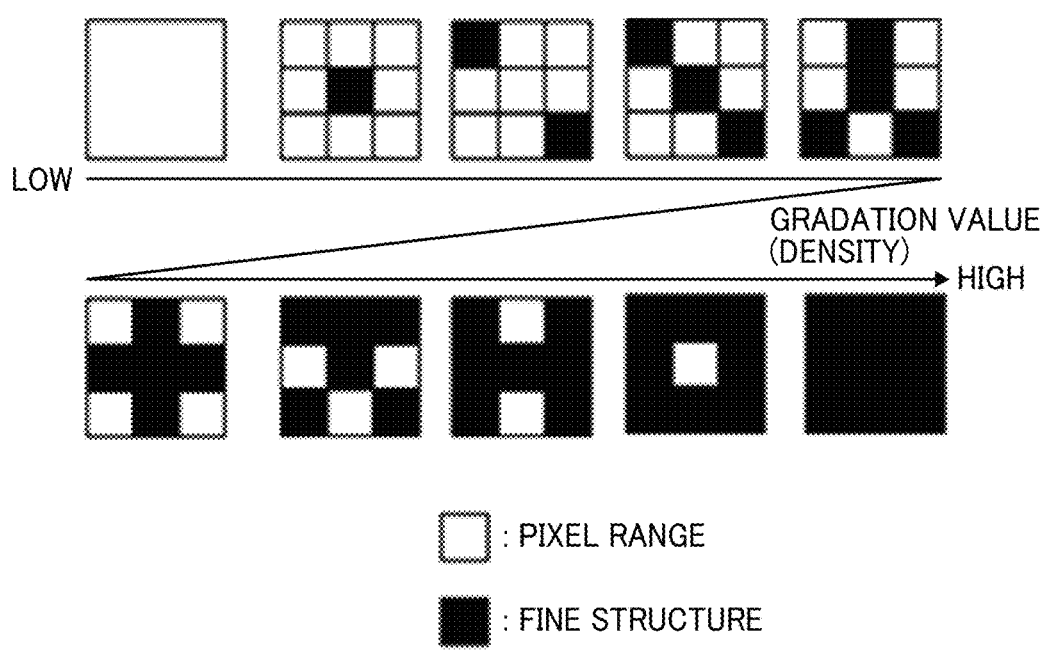
FIG. 15A is a diagram of variations of the gradation value by the pixel output on the container as an example.
Figure 15B:
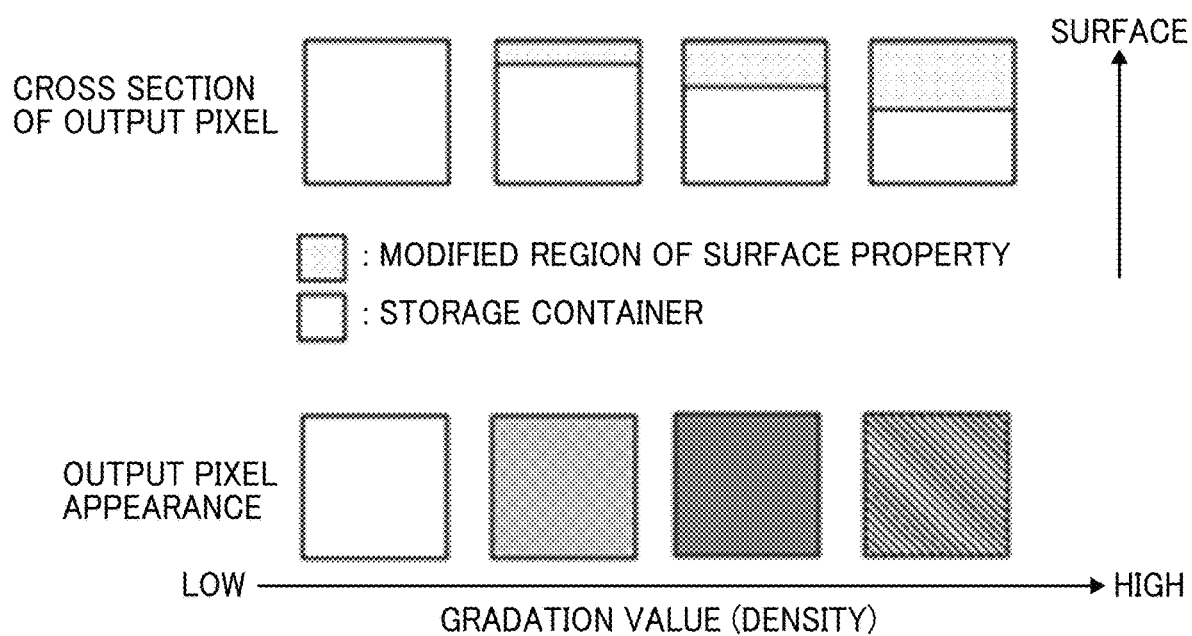
FIG. 15B is a diagram of variations of the gradation value by the pixel output on the container as yet another example.
Figure 15C:
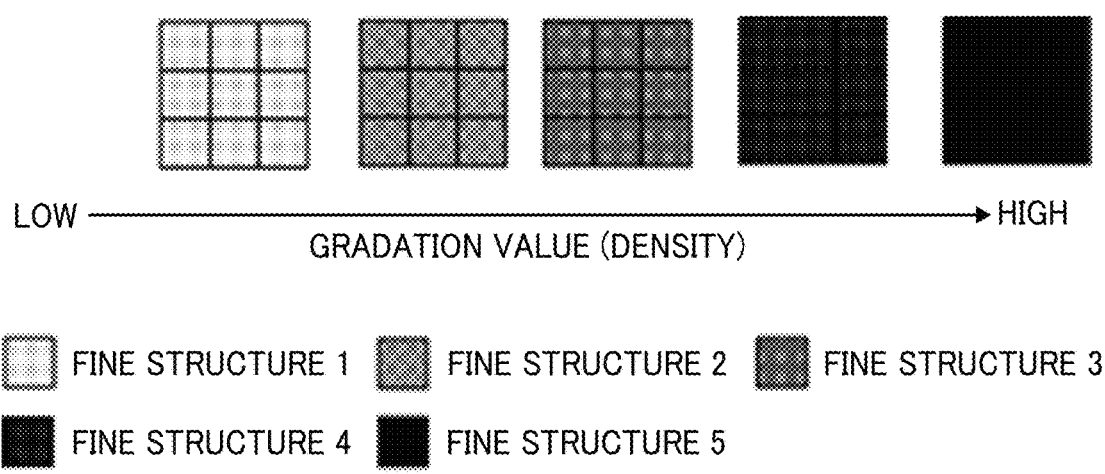
FIG. 15C is a diagram of variations of the gradation value by the pixel output on the container as yet another example.

In the present embodiment, the minute dots printed on any portion of the surface of the container body are used for a pixel in order to express gradation value. In FIG. 15A, one square (pixel) is divided by nine small squares (3×3). When the minute dot is formed on the small square, the surface property of the small square is changed, and the color of the small square is changed to black (minute dot) from white (blank portion). Using a ratio of the small white square and the small black square in the one square (i.e., density of the minute dot) can expresses the gradation value. An arrangement of the black square and the white square has a latitude. Any arrangement may express the gradation value. When the gradation value is expressed by using the pixel as illustrated in FIG. 15A, the number of gradation value is determined by the size of the minute dot and the resolution for the pixel. As illustrated in FIG. 15B, the gradation value of the pixel may be expressed by the surface property change in the depth. The gradation value illustrated in FIG. 15B is an example, and is not limited thereto. In some embodiments, as illustrated in FIG. 15C, the gradation value may be changed by changing the optical property of the microstructure.

In the present embodiment, the PET bottle is described as an example of the container. However, the container is not limited to the PET bottle. A transparent container made of, for example, other kinds of resin or glass may be used. The processing method to form the minute dot or the microstructure is not limited to the laser processing. For example, the minute dots or the microstructure may be formed by other methods such as cutting or chemical reaction.

In some embodiments, depending on the color of the content, the printing portion printed on the container containing the content has higher visibility. In the case where the printing portion appears whitish or white, the contrast is higher when the color of the content in the container is darker or black. The other colors having a higher contrast may be brown or colorless. In contrast, in the case where the printing portion appears darker, the contrast is higher when the color of the content in the container is whitish or white. In the case of formation of the minute dots having a darker or black color, carbonization to form the printed portion may be used the container may be colorless or colored.

Seventh Embodiment

Figure 16A:
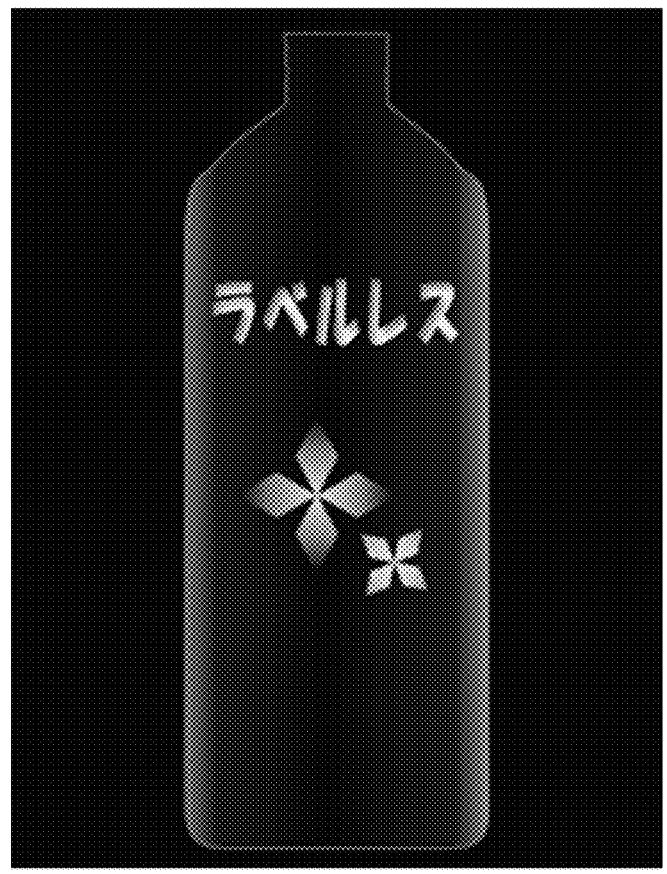
FIG. 16A is a diagram of the container having an integrated printing according to the fifth embodiment.
Figure 16B:
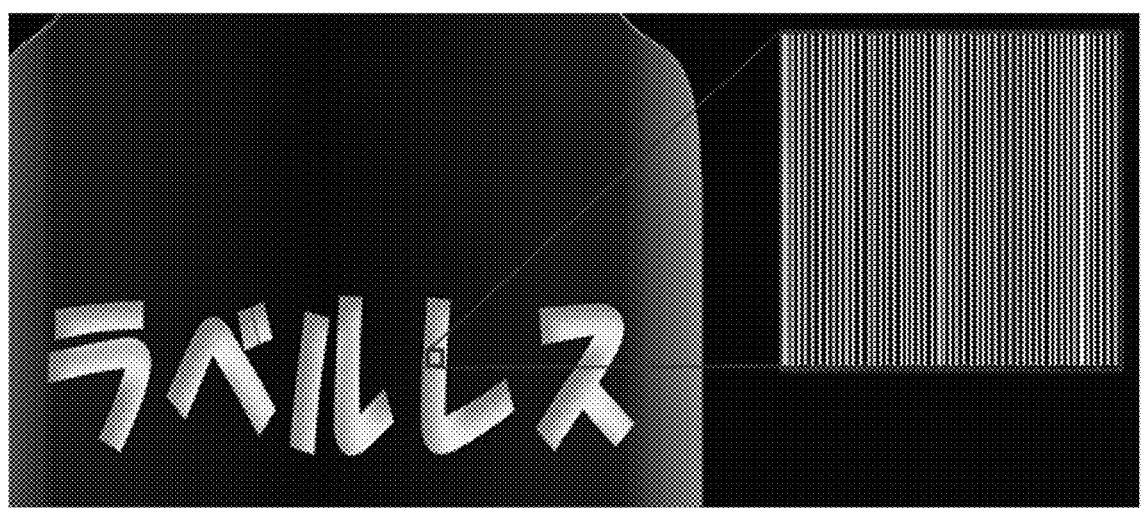
FIG. 16B is an enlarged view of the integrated printing in FIG. 17A.

FIG. 16A is a diagram of the container having an integrated printing according to the fifth embodiment. FIG. 16B is an enlarged diagram of the printing portion of FIG. 16A. FIGS. 16A and 16B are the diagrams of the container having an integrated printing, and the printing portion (recognizable portion or white portion) includes an aggregate of multiple microstructures in which the property of the material of the containers is changed.

Figure 17:
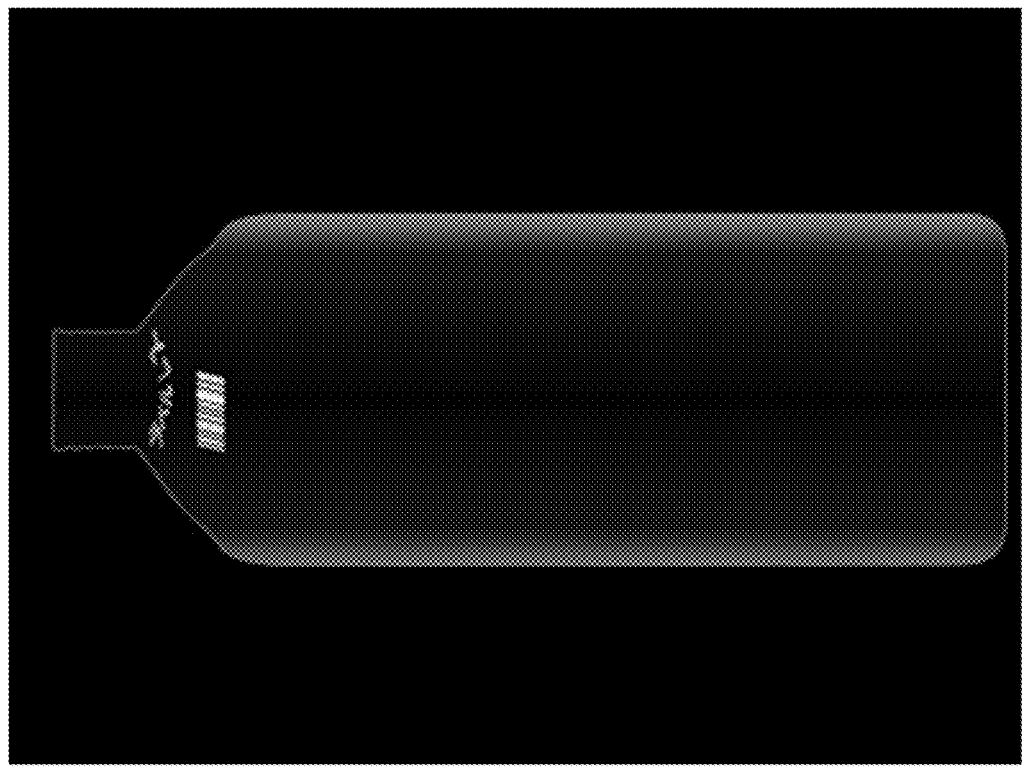
FIG. 17 is a diagram of the container having an integrated printing printed on a curved surface in the vicinity of a finish portion of the container as an example.

In the present embodiment, the cross section of the container may be a circular shape or a polygonal shape. Thus, the container has multiple surface to be printed and a curved surface, multiple flat surface, or a combination thereof. FIG. 17 is a diagram of the container having an integrated printing printed on a curved surface in the vicinity of a spout portion of the container.

Figure 18:
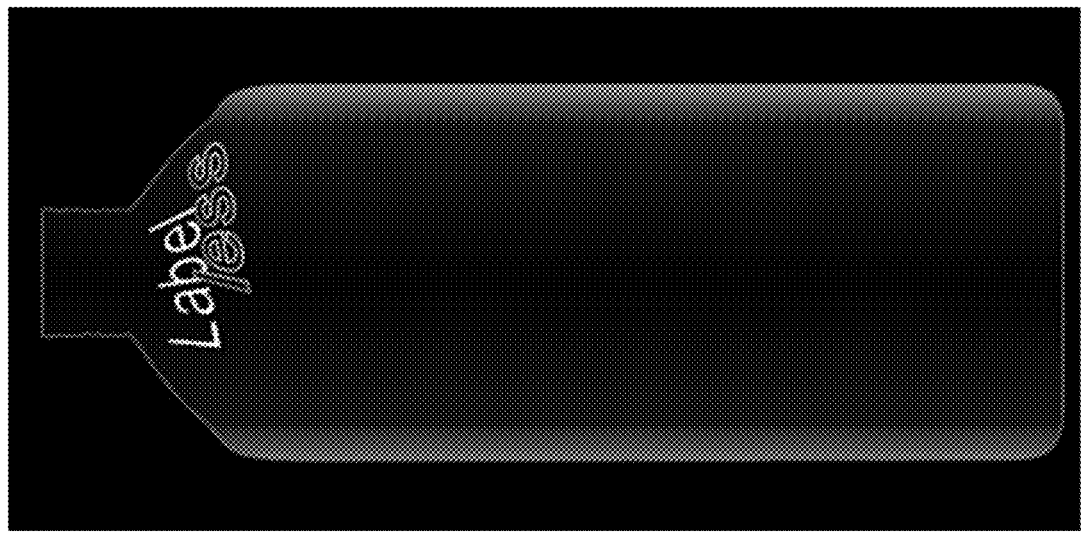
FIG. 18 is a diagram of the container having an integrated printing printed on a curved surface in the vicinity of the finish portion of a container as yet another example.

As illustrated in FIG. 18, a coordinate system is set so that a Y-axis are along the longitudinal direction of the container. As viewed from the Y-axis (ZX-plane), the visibility of the printed portion is better than as viewed from the X-axis or Z-axis. When a manufacturer name, a product name, an image, a logo, a QR code (registered trademark), or a bar code is printed on the curved surface of the container, it is easy to understand for workers who packs the container in a box.

Figure 19:
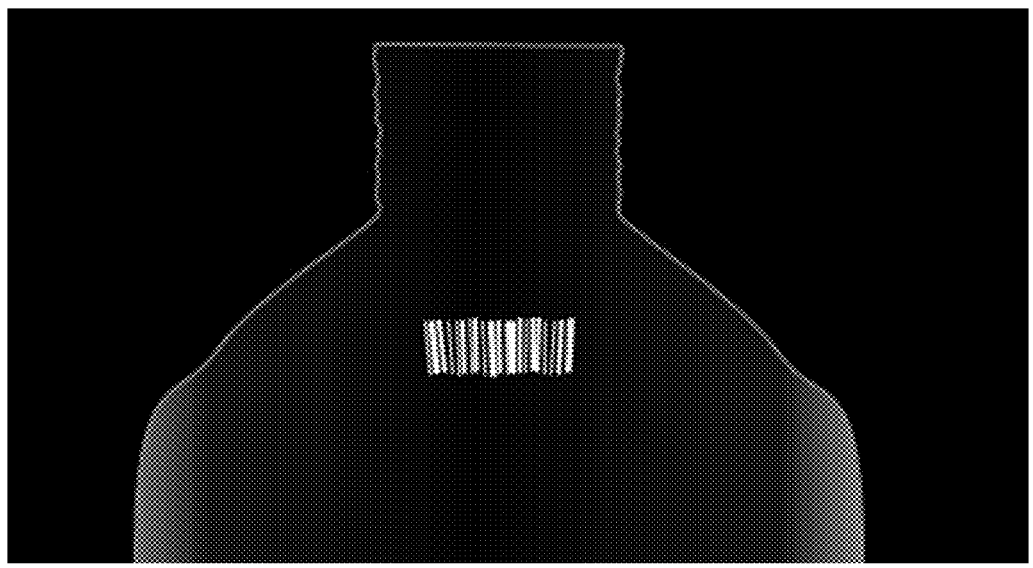
FIG. 19 is a diagram of the container having an integrated printing printed on a curved surface in the vicinity of a finish portion of the container as another example.

As illustrated in FIG. 19, in order to improve the visibility of the printed portion as viewed from the Y-axis, multiple bars of the bar code is printed on the curved surface so that intervals of the bars are narrower closing to the end of the bars. As a result, the visibility of the bar code is increased.

Figure 20:
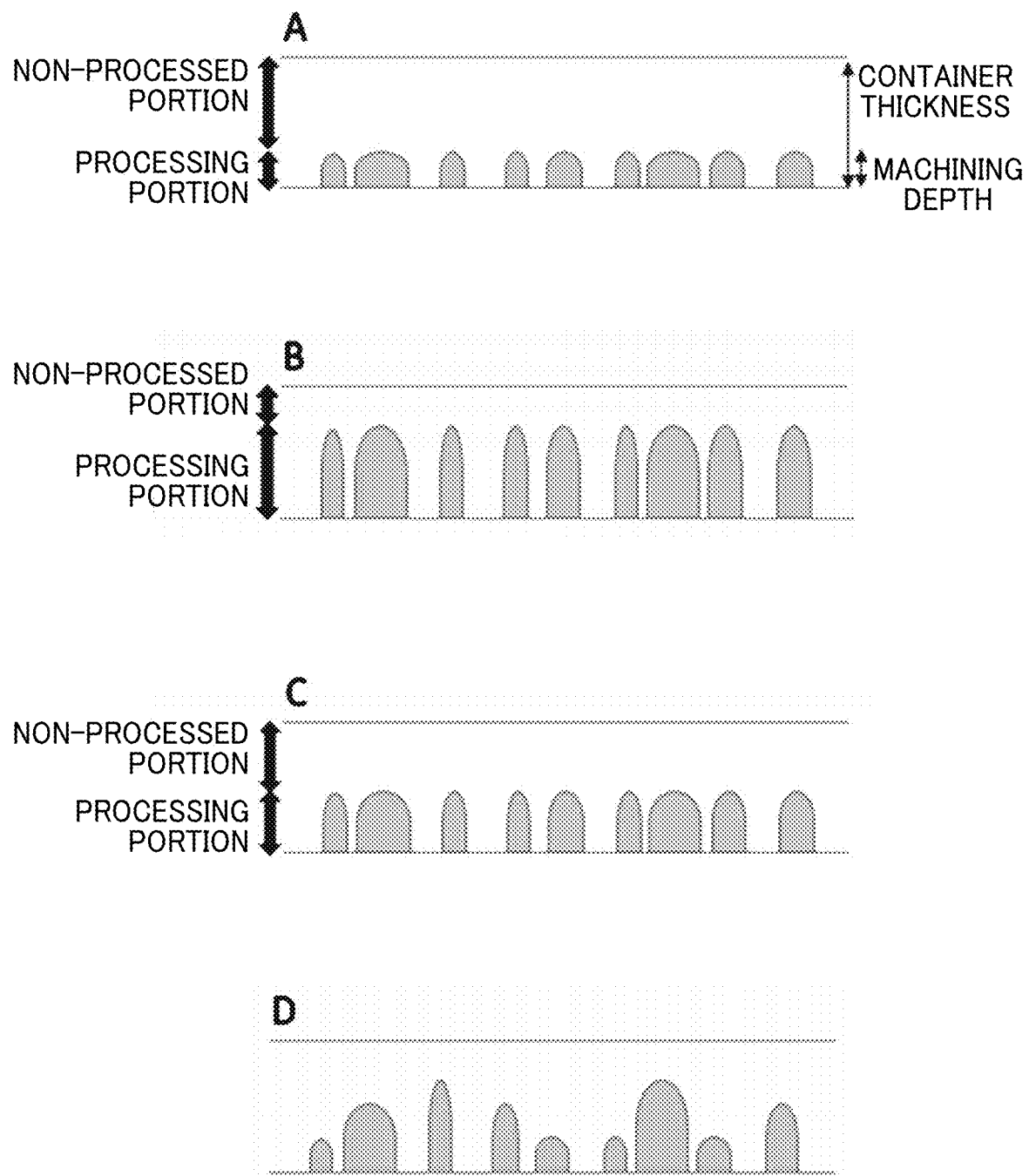
FIG. 20 is a diagram of variations in processing depth.

In FIG. 20, diagrams of variations in processing depth are illustrated. As the variations in processing depth, there are four conditions A to D below. A: The ratio of the processed portion to the non-processing portion is 1 to 9 at lowest and 3 to 7 at highest in the processing depth. In the present condition, the intensity of the laser emission is higher. B: The ratio of the processed portion to the non-processing portion is 7 to 3 at lowest and 9 to 1 at highest in the processing depth. C: The ratio of the processed portion to the non-processing portion is 4 to 6 at lowest and 6 to 4 at highest in the processing depth. Specifically, in the condition A, when the container thickness is a range from 100 µm to 500 µm, the processing depth is, for example 10 µm. The volume of the container may be 500 mL or 2 L, up to 30 L.

Figure 21:
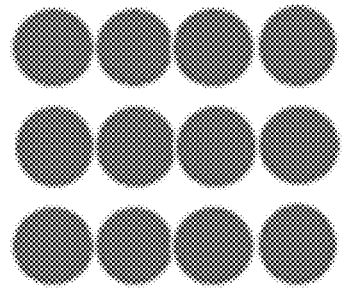
FIG. 21 is a diagram of spots and overlapped spots of the laser light in multi-beam processing.
Figure 21:
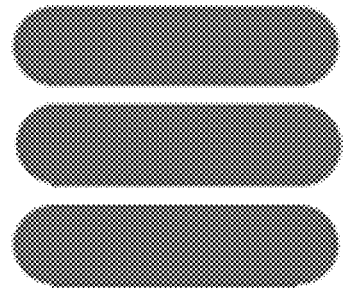
Figure 21:
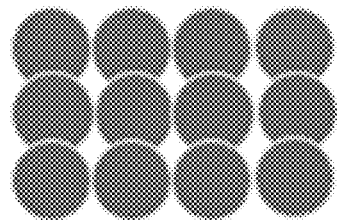
Figure 21:
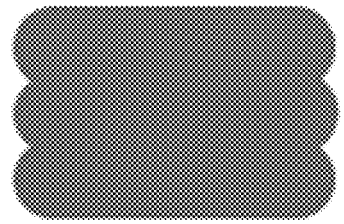
Figure 21:
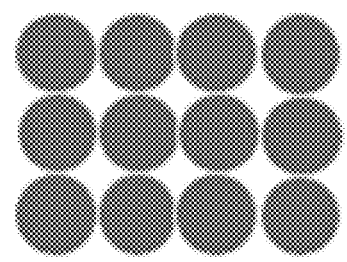
Figure 21:
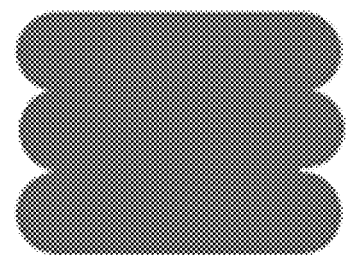

In the laser emission for marking, multiple beams (multi-beam) are used to increase the speed of processing. An arrangement of the multi-beam laser is an 1D arrangement, and there are three variations in the overlap between beams. FIG. 21 is a diagram of spots and overlapped spots of the laser light in multi-beam processing. In terms of the condition A, for example, a processing width is 42.6 µm and the interval is 23.6 µm.

Eighth Embodiment

Figure 22:
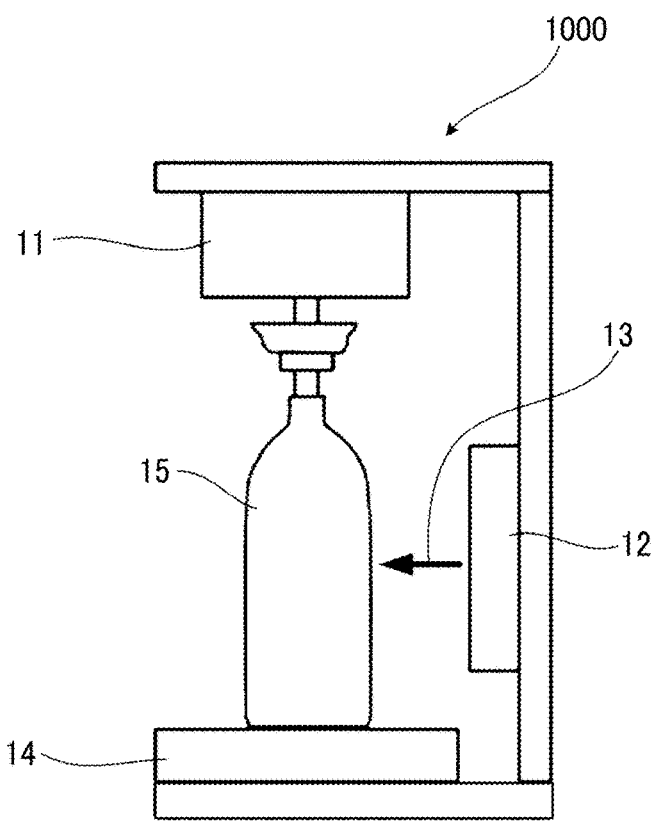
FIG. 22 is a diagram of an example of a laser processing apparatus for the container according to the eighth embodiment.

FIG. 22 is a diagram of a laser processing apparatus 1000 for a container such as a plastic bottle according to the eighth embodiment as an example. The laser processing apparatus 1000 includes a rotation unit 11, a marking unit 12, and a conveyor unit 14. The marking unit 12 emits laser light 13 to the container such as a plastic bottle while rotating the container body 15 by the rotation unit 11 and form a processing shape on the container body 15. The container body 15 being conveyed by the conveyor unit 14 is marked by the marking unit 12 to form the processing shape. The laser processing apparatus 1000 illustrated in FIG. 22 is viewed from the moving direction of the conveyor (conveying direction). In some embodiments, the laser is fixed to emit, and the container body 15 is rotated by the rotation unit 11. In some embodiments, the container body 15 is fixed and the laser is moved to emit. When the container body 15 is moved, a synchronized control or a constant-speed rotation control may be used. The synchronized control rotates the container body15 at a certain angle and emits the laser light to perform laser processing (rotation and process), and repeats the rotation and process. The constant-speed rotation control rotates the container at constant speed and performs laser processing. The container hold part may hold the spout portion, a side portion, or a bottom portion of the container body 15. The container may be placed vertically, horizontally, or obliquely during the processing.

Figure 23:
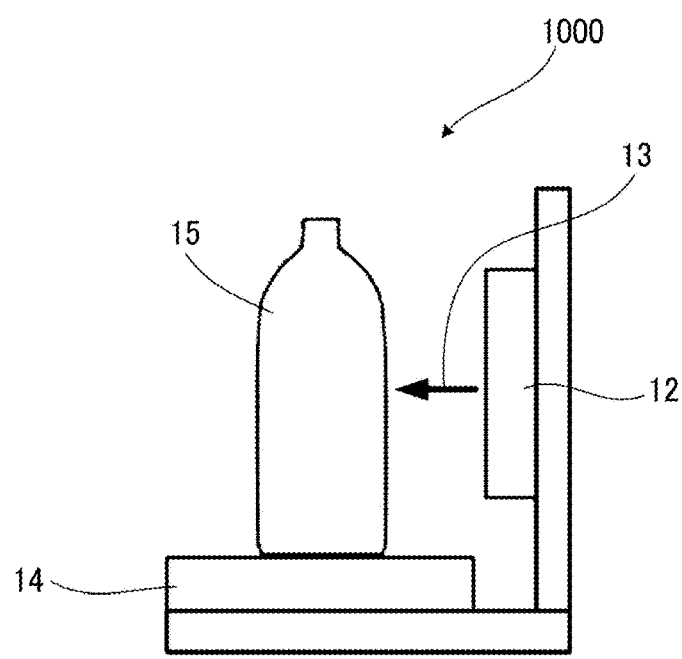
FIG. 23 is a diagram of another example of a laser processing apparatus for the container according to the eighth embodiment.
Figure 24:
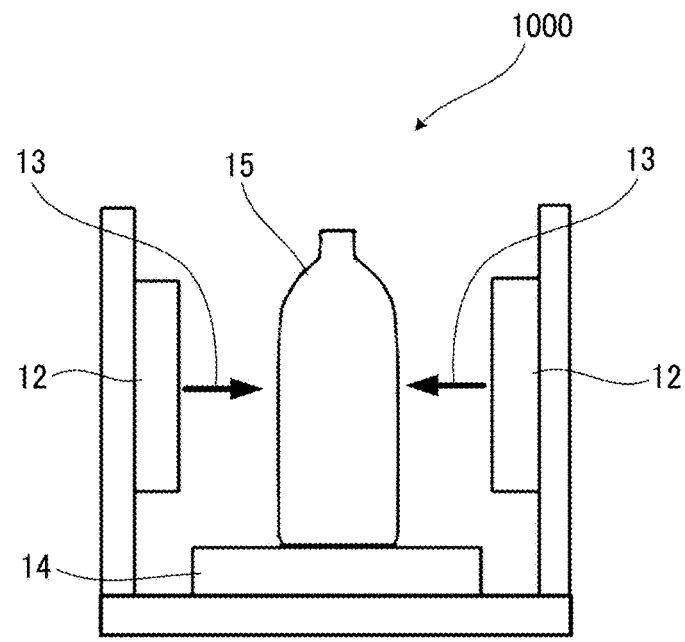
FIG. 24 is a view of yet another example of the storage container manufacturing apparatus according to the eighth embodiment.

As illustrated in FIG. 23, laser marking may be performed from one side when passing through the conveyor, or as illustrated in FIG. 24, laser marking may be performed simultaneously from multiple positions when passing through the conveyor.

Figure 25:
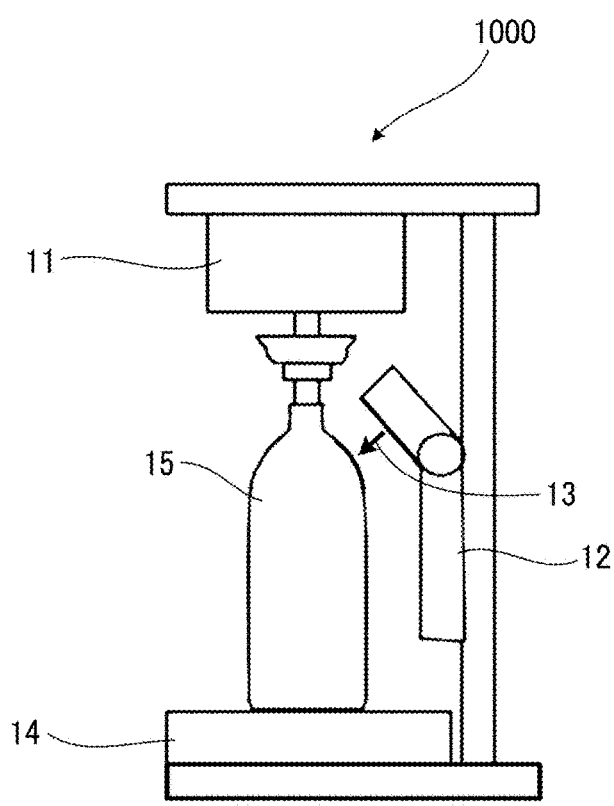
FIG. 25 is a diagram of a laser processing apparatus having a marking unit tilted with respect to a side of the container body so that minute dots are printed on a slope portion of the container body.
Figure 26:
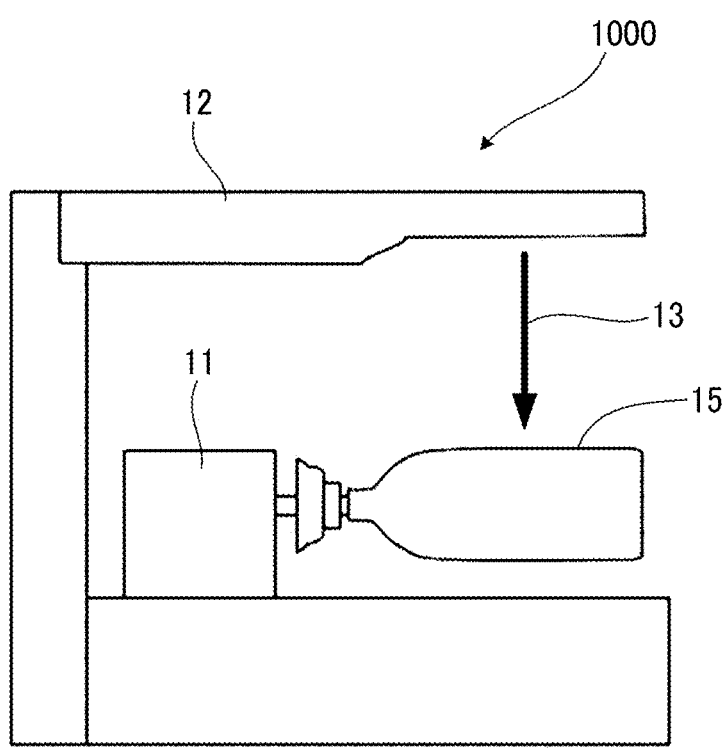
FIG. 26 is a diagram of a laser processing apparatus in which a container body is horizontally hold.

In FIG. 25, the marking unit 12 is arranged to be tilted with respect to a slope portion of the container body 15 so that the marking unit 12 form a processing shape on the slope portion of the container body 15. The marking unit 12 is disposed at a position tilted with respect to the container body 15 at a predetermined angle with respect to the container body 15, and the predetermined angle is changeable. FIG. 26 is an example of a laser processing apparatus 1000 to process a container in which the container body 15 is placed horizontally.

Figure 27:
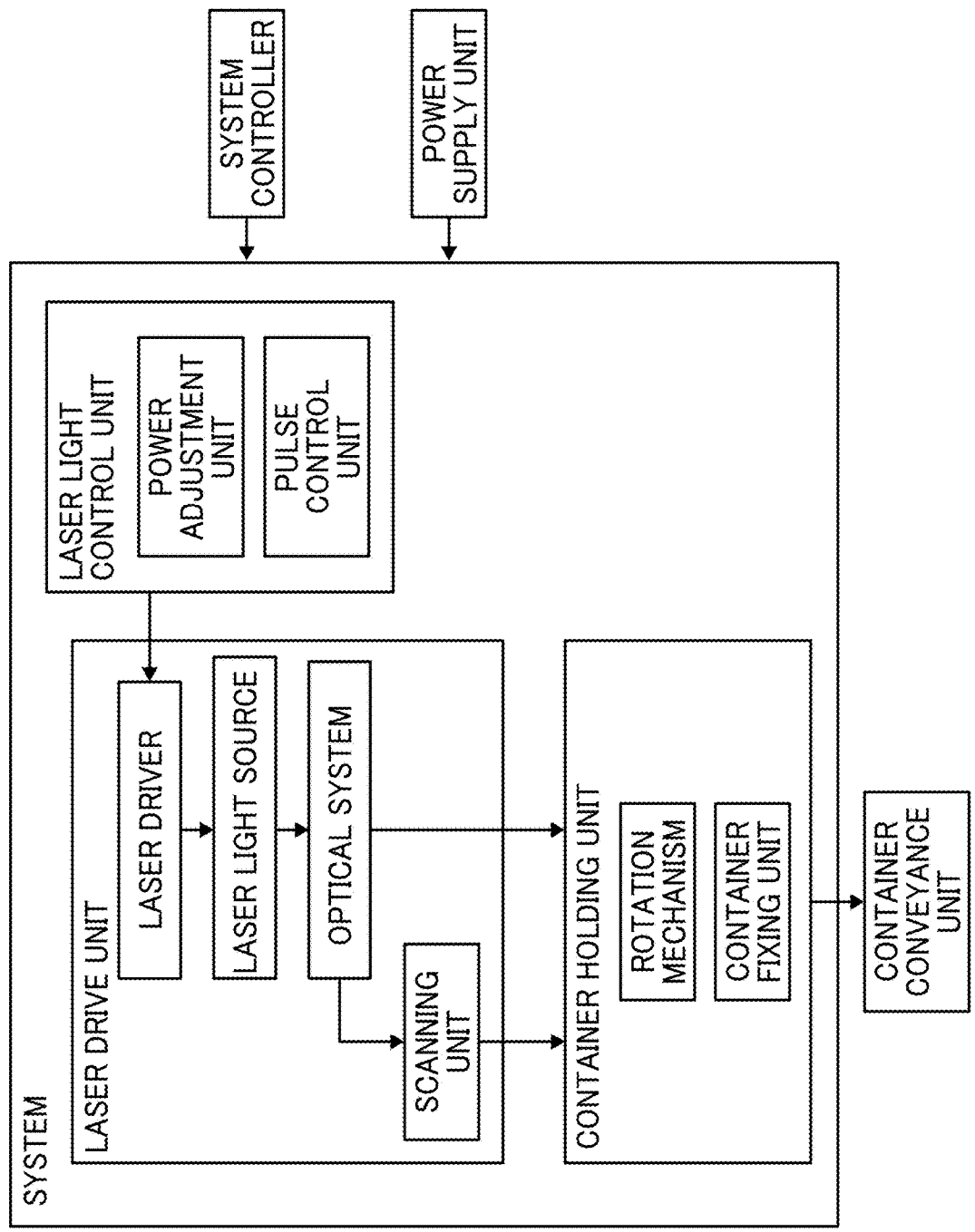
FIG. 27 is a functional block diagram of the laser processing apparatus for a container.

FIG. 27 is a functional block diagram of a marking unit in the laser processing apparatus according to the eighth embodiment. The marking unit includes a laser light control unit, a laser driving unit, and a container holding unit. The container holding unit may not be provided, and the laser driving unit may not be provided with the scanning unit.

Figure 28A:
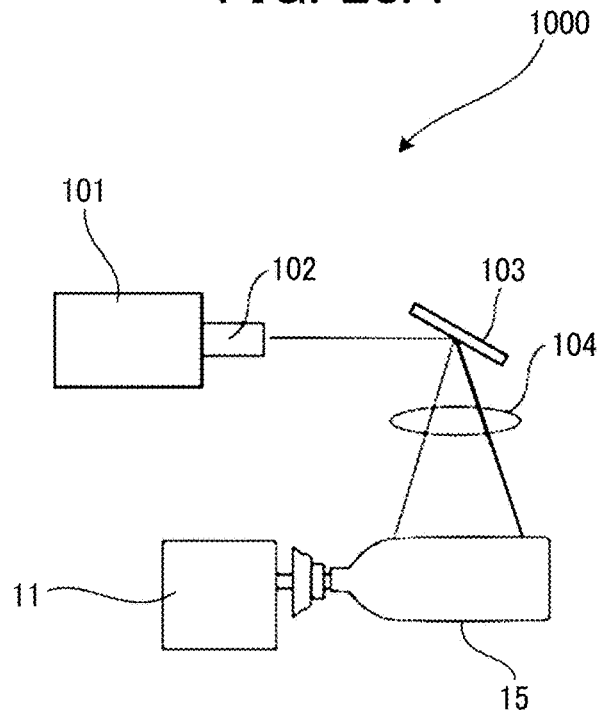
FIG. 28A is a diagram of a scanning unit of a laser driving unit in the laser processing apparatus for a container.
Figure 28B:
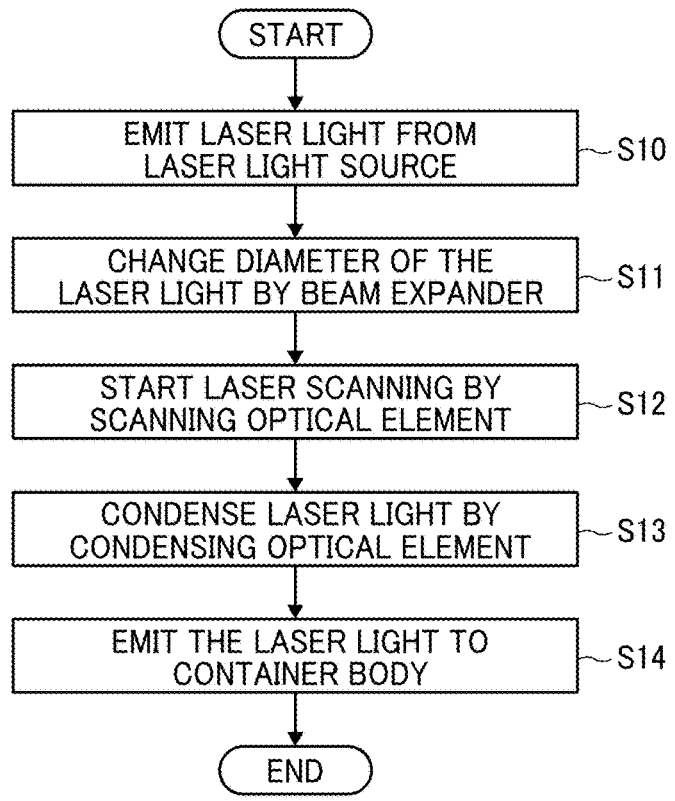
FIG. 28B is a flowchart of the laser processing using the laser processing apparatus in FIG. 28A.

The laser processing apparatus according to the sixth embodiment may include a scanning unit (raster scanning unit) of the laser driving unit as illustrated in FIG. 28A. As illustrated in FIG. 28A, the laser processing apparatus 1000 includes a laser light source 101 (laser oscillator), a beam expander 102, an optical scanning device 103, a condensing optical element 104, and a rotation unit 11. FIG. 28B is a flowchart of a processing procedure of a scanning unit of a laser driving unit in the apparatus for manufacturing containers. The processing procedure of the scanning unit will be described with reference to FIG. 28A.

In the step S10, the laser light source 101 emits laser light, the scanning unit in the laser driving unit of the laser processing apparatus moves the step to the step 11. In the step S11, the beam size of the laser light is changed by the beam expander 2, the laser scanning unit moves the step to the step 12. In the step S12, the optical scanning device3 starts laser light scanning, the laser scanning unit moves the step to the step 13. In step S13, the condensing optical element 104 condenses the laser light, the laser scanning unit moves the step to the step 14. In step S14, the scanning unit emits the laser light to the container body 15, and the laser scanning unit finished the step.

Figure 29A:
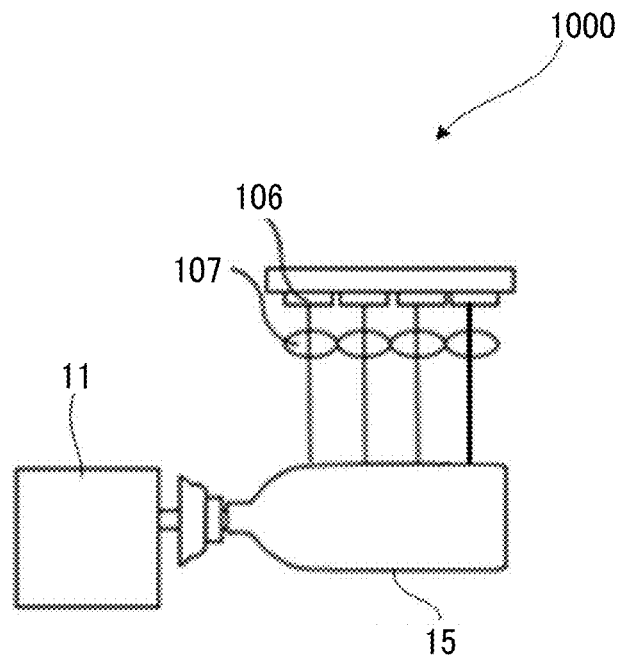
FIG. 29A is a diagram of a configuration of a laser processing apparatus having an arrayed laser.
Figure 29B:
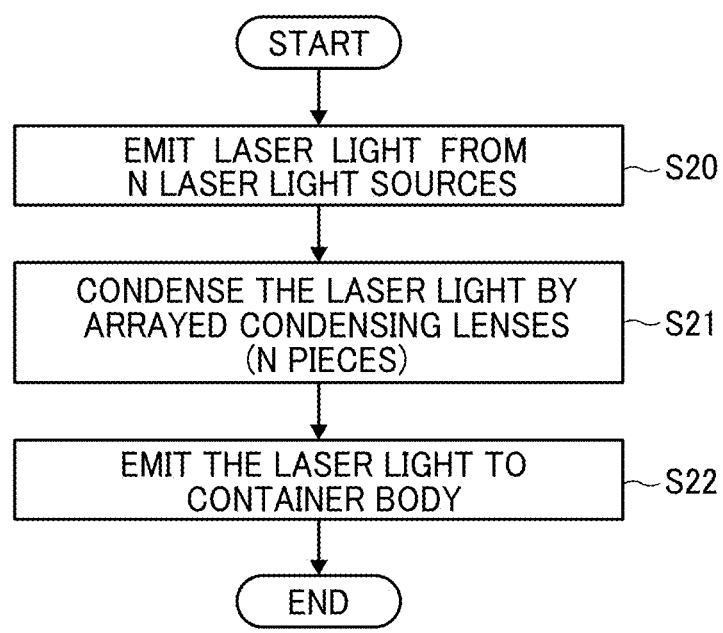
FIG. 29B is a flowchart of the laser processing using the laser processing apparatus in FIG. 29A.

As illustrated in FIG. 29A, the laser processing apparatus 10 includes the laser driving unit in which the optical system is arrayed according to the eighth embodiment. As illustrated in FIG. 29A, the laser processing apparatus 1000 for manufacturing containers includes a laser light source 106 and a rotation unit 11. The laser light source 106 includes multiple optical elements 107 (i.e., arrayed condensing lenses). FIG. 29B is a flowchart of the laser processing in the laser driving unit of the laser processing system according to an eighth embodiment. A processing procedure of the optical system of the laser driving unit will be described with reference to the FIG. 29A.

In step S20, the laser light sources 106 (including n light sources) emit laser light, the optical system of the laser driving unit of the laser processing apparatus moves to the step to step 21. In Step S21, the multiple optical element 107 (arrayed condensing lenses (including n lenses)) condense the laser light, and the optical system of the laser driving unit moves the step to the step 22. In step S22, the scanning unit emits the laser light to the container body 15, and the optical system of the laser driving unit finishes the step.

Figure 30:
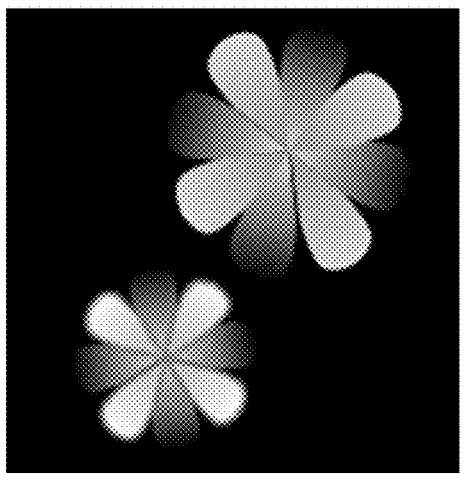
FIG. 30 is a diagram of a design having a fine pattern to be formed on a container.

FIG. 30 is an image of a pattern, which has a fine structure, formed on the container of the present embodiment. Such a design contributes to improvement of a commodity value of the container. To achieve fine structure, a drawing technique such as pointillism or gradation is used. An expression using binary or multiple values may be used. Preferably, image size or region covers substantially the entire region in the height direction of the container. Specifically, a drawing region has a height of 2 cm to 20 cm. For example, the height of image forming is 2.54 cm in single process. When the total process area is larger for the single process, the area may be divided into several smaller areas for the single process. Such a process is economical.

Figure 31:
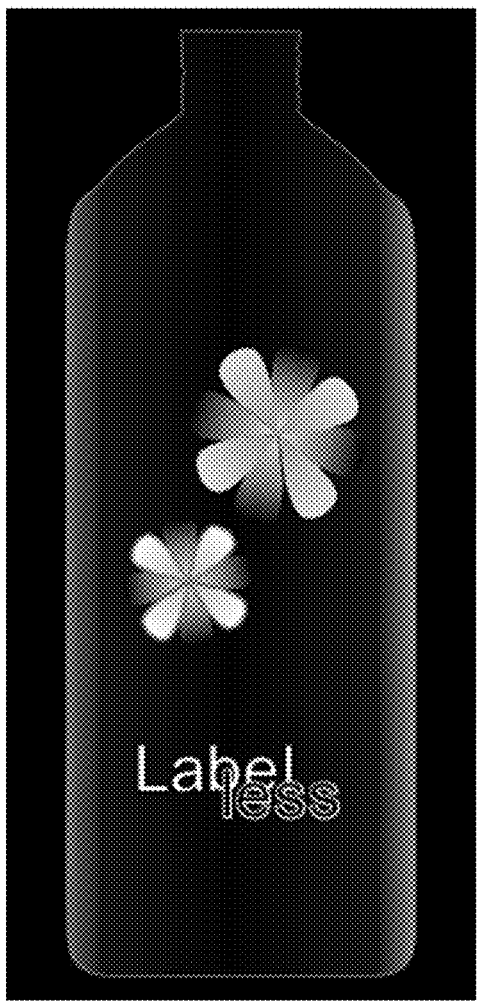
FIG. 31 is a diagram of a PET bottle having the design having a fine pattern.
Figure 32:
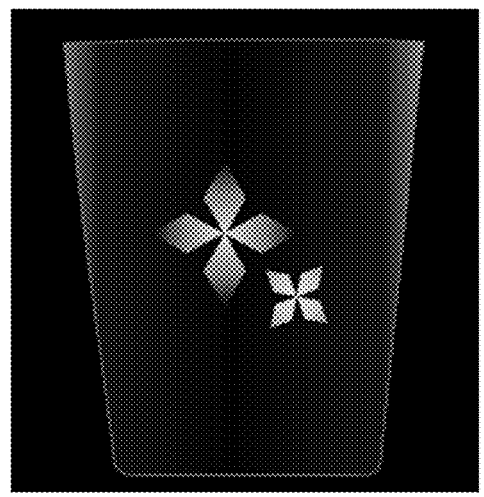
FIG. 32 is a diagram of a plastic cup having a design having a fine pattern.

In the present embodiment, the size of the laser beam is smaller, and the bunch of the smaller laser beam forms the pattern having a fine structure. As compared with the typical laser processing (e.g., carbon dioxide laser). the present laser processing forms a fine structure. FIG. 31 is an image of a delicate design formed of a PET bottle. Examples of the container may include a plastic cup used for providing iced coffee in a convenience store. FIG. 32 is a diagram of the application of a delicate design to a plastic cup.

As described above, the embodiments of the present invention have been described in detail, but the embodiment of the present invention is not limited thereto. Various modifications may be made without departing from the scope of the present invention.

Aspects of the present invention are as follows, for example.

In a first aspect, a laser processing system includes: multiple light emitting devices (first light emitting device and second light emitting device) each having a light emitter to laser light; and a light scanner to scan a workpiece the laser light. The multiple light emitting devices process a workpiece. The first light emitting device process the first processing region on the workpiece and the second light emitting device process the second process region on the workpiece. The first processing region and the second processing region are different regions on the workpiece. The normal direction of the processing surface of the first region and the normal direction of the processing surface of the second region have an angle difference.

In a second aspect, in the laser processing system according to the first aspect, the angle difference is 90° or more and 270° or less.

In a third aspect, in the laser processing system according to the first aspect or the second aspect, the workpiece is conveyed to a processing region of multiple the light emitting devices by a conveyor, and the first light emitting device and the second light emitting device are disposed adjacently each other in a conveying direction.

In a fourth aspect, in the laser processing system according to any one of the first aspect to the third aspect, the first light emitting device and the second light emitting device are made a pair, and multiple pairs of light emitting devices are disposed.

In a fifth aspect, in the laser processing system according to the third aspect or the fourth aspect, an orientation of the workpiece does not change in a direction other than the conveying direction in a conveying region from a processing start position of the first light emitting device to a processing end position of the second light emitting device.

In a sixth aspect, in the laser processing system according to the third aspect or the fourth aspect, in a conveyance region from the processing start position of the first light emitting device to a processing end position of the second light emitting device, the workpiece does not contact the conveyor excluding a conveying surface.

In a seventh aspect, in the laser processing system according to any one of the first aspect to the sixth aspect, the light scanner of the first light emitting device includes a first deflector and a first imaging optical element, the light scanner of the second light emitting device includes a second deflector and a second imaging optical element, and an expression (1) below is satisfied:

$$L > (WD1 + d/2) \times \tan(\theta1/2) + CA1/2 + (WD2 + d/2) \times \tan(\theta2/2) + CA2/2, \quad (1)$$

where L is the length (mm) between the optical axis center of the first light emitting device and the optical axis center of the second light emitting device, the deflection angle θ1 (°) of the first deflector, the deflection angle θ2 (°) of the second deflector, the working distance WD1 (mm) of the first imaging optical element, the working distance WD2 (mm) of the second imaging optical element, the aperture size CA1 (mm) of the first imaging optical element, the aperture size CA2 (mm) of the second imaging optical device, and the maximum aperture size d (mm) of the workpiece.

In an eighth aspect, the laser processing system according to any one of the first aspect to the seventh aspect, a light shield is provided between the first light emitting device and the second light emitting device.

In a ninth aspect, in the laser processing system according to any one of the third aspect tot the eighth aspect, an emitting port in the light emitter of the first light emitting device and an emitting port in the light emitter of the second light emitting device are positioned on the same side with respect to the conveyor.

In a tenth aspect, in the laser processing system according to any one of the third aspect to the eighth aspect, the emitting port in the light emitter of the first light emitting device and an emitting port in the light emitter of the second light emitting device are positioned on different sides with respect to the conveyor.

In an eleventh aspect, the laser processing system includes multiple light emitting devices (e.g., first light emitting device and the second light emitting device) each including a light emitter to emit laser light; and a light scanner to scan a region of the workpiece with the laser light emitted from the light emitter. A first region on the workpiece is processed by the laser light (first laser light) emitted from the first light emitting device and a second region on the workpiece is processed by the laser light (second laser light) emitted from the second light emitting device are different regions on the workpiece. The first region is a projection on a conveying plane by the first laser light and the second region is a projection on the conveying plane by the second laser light. At least the first region or the second region crosses the conveyor.

In a twelfth aspect, in the laser processing system according to the eleventh aspect, the laser light is reflected by one or more mirrors and hits the workpiece after at least the first region or the second region crosses the conveying path. In a thirteenth aspect, a laser processing system is a combination of the laser processing system according to any one of the first aspect to the tenth aspect and the laser processing system according to the eleventh aspect or the twelfth aspect.

In a fourteenth aspect, includes: multiple light emitting devices (first light emitting device and second light emitting device) each having a light emitter to laser light; and a light scanner to scan a workpiece the laser light. The multiple light emitting devices process a workpiece. The first light emitting device process the first processing region on the workpiece and the second light emitting device process the second process region on the workpiece. The first processing region and the second processing region are different regions on the workpiece. The normal direction of the processing surface of the first region and the normal direction of the processing surface of the second region have an angle difference.

In a fifteenth aspect, a laser processing system includes: a first light irradiator including: a first light emitter to emit first laser light; and a first light scanner to scan a first region of a workpiece with the first laser light emitted from the first light emitter; a second light irradiator including: a second light emitter to emit second laser light; and a second light scanner to scan a second region of the workpiece different from the first region of the workpiece with the second laser light emitted from the second light emitter. The first light irradiator emits the first laser light to the first region of the workpiece in a first irradiation direction, the second light irradiator emits the second laser light to the second region of the workpiece in a second irradiation direction opposite to the first irradiation direction.

In a sixteenth aspect, in the laser processing system according to the fifteenth aspect, a first normal direction of a first processing surface of the first region and a second normal direction of a second processing surface of the second region have an angle difference.

In a seventeenth aspect, in the laser processing system according to sixteenth aspect, the angle difference is 90° or more and 270° or less.

In an eighteenth aspect, the laser processing system according to the fifteenth aspect or the sixteenth aspect further including a conveyor to convey the workpiece in a conveying direction. The first light irradiator and the second light irradiator are disposed at different positions in the conveying direction.

In a nineteenth aspect, the laser processing system according to the fifteenth aspect or the sixteenth aspect further includes a conveyor to convey the workpiece in a conveying direction. The first light irradiator and the second light irradiator are disposed at the same position in the conveying direction and facing each other across the conveyor.

In a twentieth aspect, in the laser processing system according to any one of the fifteenth aspect to the seventeenth aspect, the first light irradiator includes multiple first light irradiators, the second light irradiator includes multiple second light irradiators, and the multiple first light irradiators are respectively paired with the multiple second light irradiators.

In a twenty-first aspect, in the laser processing system according to the seventeenth aspect or the eighteenth aspect, the second light irradiator is disposed on a downstream of the first light irradiator in the conveying direction, the conveyor conveys the workpiece while maintaining orientation of the workpiece constant from a light emitting start position, at which the first light irradiator starts irradiation of the first region of the workpiece, to a light emitting end position, at which the second light irradiator ends irradiation of the second reaction of the workpiece.

In a twenty-second aspect, in the laser processing system according to the seventeenth aspect, or the eighteenth aspect, the conveyor contacts a setting surface of the workpiece different from the first region and the second region and does not contact the first region and the second region of the workpiece.

In a twenty-third aspect, in the laser processing system according to any one of the fifteenth aspect to the twenties aspect, the first light irradiator includes a first light scanner including: a first light deflector; and a first optical element attached to the first light deflector, the second light irradiator includes a second light scanner including:

a second light deflector; and a second optical element attached to the second light deflector, and the laser processing system satisfy a following condition (1) in which:

$$L > (WD1 + d/2) \times \tan(\theta 1/2) + CA1/2 + (WD2 + d/2) \times \tan(\theta 2/2) + CA2/2, \quad (1)$$

where L (mm) is a distance between a center of the optical axis of the first light irradiator and a center of the optical axis of the second light irradiator, θ1 (°) is a deflection angle of the first deflector, θ2 (°) is a deflection angle of the second deflector, WD1 (mm) is a working distance of the first imaging optical elemental element, WD2 (mm) is a working distance of the second imaging optical element, CA1 (mm) is a diameter of an aperture of the first imaging optical element, CA2 (mm) is a diameter of an aperture of the second imaging optical element, and d (mm) is a maximum diameter of the workpiece.

In a twenty-fourth aspect, in the laser processing system according to any one of the fifteenth aspect to the twenty-first aspect, a light shield between the first light irradiator and the second light irradiator.

In a twenty-fifth aspect, in the laser processing system according to the twenty fourth aspect, the light shield includes: a first light shield adjacent to the first region along the conveying direction, the first light shield to block the first laser light emitted from the first light irradiator to enter the second light irradiator; and a second light shield adjacent to the second region along the conveying direction, the second light shield to block the second laser light emitted from the second light irradiator to enter the first light irradiator.

In a twenty-sixth aspect, in the laser processing system according to any one of the seventeenth aspect to the twenty-second aspect, the first light irradiator includes a first emitting port to emit the first laser light, the second light irradiator includes a second emitting port to emit the second laser light, and the first emitting port and the second emitting port are at a same side of the conveyor.

In a twenty-seventh aspect, in the laser processing system according to any one of the seventeenth aspect to the twenty-second aspect, the first light irradiator includes a first emitting port to emit the first laser light, the second light irradiator includes a second emitting port to emit the second laser light, and the conveyor is disposed between the first emitting port and the second emitting port.

In a twenty-eighth aspect, the laser processing system according to the twenty-sixth aspect further comprising a bending element to bend the second laser light emitted from the second emitting port to the second irradiation direction opposite to the first irradiation direction.

In a twenty-ninth aspect, in the laser processing system according to the twenty-eighth aspect, the bending element is a mirror to reflect the laser light.

In a thirtieth aspect, the laser processing system includes the laser processing system according to any one of the fifteenth aspect to the seventeenth aspect combined with the laser processing system according to the twenty-eighth aspect or the twenty-ninth aspect.

In a thirty-first aspect, a light irradiator includes: a light emitter to emit laser light; a light scanner to scan a workpiece with the laser light emitted from the light emitter; a first emitting port from which the laser light is emitted; and a second emitting port from which the laser light is emitted, the second emitting port being different from the first emitting port. The laser light emitted from the first emitting port is emitted to a first processing surface of a first region of the workpiece, the laser light emitted from the second emitting port is emitted to a second processing surface of a second region different form the first region of the workpiece, and a normal direction of the first processing surface and a normal direction of the second processing surface have an angle difference.

According to the laser processing system described in any one of the first aspect to the thirteenth aspect, and the light emitting device described in the fourteenth aspect.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A laser processing system comprising:
   a first light irradiator including:
      a first light emitter configured to emit first laser light; and
      a first light scanner configured to scan a first region of a workpiece with the first laser light emitted from the first light emitter;
   a second light irradiator including:
      a second light emitter configured to emit second laser light; and
      a second light scanner configured to scan a second region different from the first region of the workpiece with the second laser light emitted from the second light emitter,
   and
   wherein:
   the first light irradiator emits the first laser light to the first region of the workpiece in a first irradiation direction,
   the second light irradiator emits the second laser light to the second region of the workpiece in a second irradiation direction opposite to the first irradiation direction,
   the first light irradiator includes a first light scanner including:
      a first light deflector; and
      a first optical element attached to the first light deflector,
   the second light irradiator includes a second light scanner including:
      a second light deflector; and
      a second optical element attached to the second light deflector, and
   the laser processing system satisfy a following condition in which:

$$L > (WD1 + d/2) \times \tan(\theta 1/2) + CA1/2 + (WD2 + d/2) \times \tan(\theta 2/2) + CA2/2, \quad (1)$$

where L (mm) is a distance between a center of the optical axis of the first light irradiator and a center of the optical axis of the second light irradiator,
θ1 (°) is a deflection angle of the first light deflector,
θ2 (°) is a deflection angle of the second light deflector,
WD1 (mm) is a working distance of the first imaging optical elemental element,
WD2 (mm) is a working distance of the second imaging optical element,
CA1 (mm) is a diameter of an aperture of the first imaging optical element,
CA2 (mm) is a diameter of an aperture of the second imaging optical element, and
d (mm) is a maximum diameter of the workpiece.

2. The laser processing system according to claim 1, wherein a first normal direction of a first processing surface of the first region and a second normal direction of a second processing surface of the second region have an angle difference.

3. The laser processing system according to claim 2, wherein the angle difference is 90° or more and 270° or less.

4. The laser processing system according to claim 3, further comprising:
   a conveyor configured to convey the workpiece in a conveying direction,
   wherein:
   the second light irradiator is disposed on a downstream of the first light irradiator in the conveying direction,
   the conveyor conveys the workpiece while maintaining orientation of the workpiece constant from a light emitting start position, at which the first light irradiator starts irradiation of the first region, to a light emitting end position, at which the second light irradiator ends irradiation of the second region.

5. The laser processing system according to claim 3, further comprising:
a conveyor configured to convey the workpiece in a conveying direction,
wherein the conveyor:
contacts a setting surface of the workpiece different from the first region and the second region; and
does not contact the first region and the second region.

6. The laser processing system according to claim 3, further comprising:
a conveyor configured to convey the workpiece in a conveying direction,
wherein:
the first light irradiator includes a first emitting port configured to emit the first laser light,
the second light irradiator includes a second emitting port configured to emit the second laser light, and
the first emitting port and the second emitting port are at the same side of the conveyor.

7. The laser processing system according to claim 6, further comprising:
a bending element configured to bend the second laser light emitted from the second emitting port to the second irradiation direction opposite to the first irradiation direction.

8. The laser processing system according to claim 7, wherein the bending element is a mirror to reflect the second laser light.

9. The laser processing system according to claim 3, further comprising:
a conveyor configured to convey the workpiece in a conveying direction,
wherein:
the first light irradiator includes a first emitting port configured to emit the first laser light,
the second light irradiator includes a second emitting port configured to emit the second laser light, and
the conveyor is disposed between the first emitting port and the second emitting port.

10. The laser processing system according to claim 1, further comprising:
a conveyor configured to convey the workpiece in a conveying direction,
wherein the first light irradiator and the second light irradiator are disposed at different positions in the conveying direction.

11. The laser processing system according to claim 1, further comprising:
a conveyor configured to convey the workpiece in a conveying direction,
wherein the first light irradiator and the second light irradiator are disposed at the same position in the conveying direction and facing each other across the conveyor.

12. The laser processing system according to claim 1, wherein:
the first light irradiator includes multiple first light irradiators,
the second light irradiator includes multiple second light irradiators, and
the multiple first light irradiators are respectively paired with the multiple second light irradiators.

13. The laser processing system according to claim 1, further comprising a light shield between the first light irradiator and the second light irradiator.

14. The laser processing system according to claim 13, wherein the light shield comprises:
a first light shield adjacent to the first region along the conveying direction, the first light shield configured to block the second laser light emitted from the second light irradiator to enter the first light irradiator; and
a second light shield adjacent to the second region along the conveying direction, the second light shield configured to block the first laser light emitted from the first light irradiator to enter the second light irradiator.

* * * * *